United States Patent [19]
Roberts et al.

[11] Patent Number: 5,713,420
[45] Date of Patent: Feb. 3, 1998

[54] CONVERTIBLE GARDEN TILLER

[75] Inventors: Bruce E. Roberts; Rolando Altamirano, both of Waterford, N.Y.

[73] Assignee: Garden Way, Incorporated, Troy, N.Y.

[21] Appl. No.: 519,730

[22] Filed: Aug. 28, 1995

[51] Int. Cl.⁶ ..................................... A01B 33/02
[52] U.S. Cl. ............................... 172/42; 180/6.2
[58] Field of Search ............... 56/10.5, 11.3; 172/42, 43, 41, 60, 71, 112, 125, 253; 180/6.2, 6.24

[56] References Cited

U.S. PATENT DOCUMENTS

| | | |
|---|---|---|
| 789,528 | 5/1905 | Cook et al. |
| 975,305 | 11/1910 | Wait. |
| 2,453,999 | 11/1948 | Melling ............... 180/19 |
| 2,601,698 | 7/1952 | Humphrey ............ 15/390 |
| 2,634,770 | 4/1953 | Mall ................... 172/42 X |
| 2,691,928 | 10/1954 | Kelsey et al. ......... 172/42 |
| 2,739,657 | 3/1956 | Howard .............. 180/6.2 |
| 2,750,859 | 6/1956 | Smithburn ............ 97/40 |
| 2,827,842 | 3/1958 | Peterson et al. ...... 97/40 |
| 2,998,082 | 8/1961 | Arnot ................. 172/42 |
| 3,111,996 | 11/1963 | Ertsgaard ............ 172/42 |
| 4,237,983 | 12/1980 | Allen ................. 172/42 |
| 4,244,427 | 1/1981 | Enters et al. ........ 172/42 |
| 4,286,670 | 9/1981 | Ackerman ............. 172/42 |
| 4,354,564 | 10/1982 | Watanabe et al. ..... 180/19 H |
| 4,396,067 | 8/1983 | Enters et al. ........ 172/42 |
| 4,519,459 | 5/1985 | Reaume ............... 172/42 |
| 4,739,850 | 4/1988 | Fujioka ............. 180/19.3 |
| 4,895,210 | 1/1990 | Witzel ............... 172/42 X |
| 5,520,253 | 5/1996 | Kesting .............. 172/42 X |

FOREIGN PATENT DOCUMENTS 841659  5/1939  France.
939352  10/1963  United Kingdom.

*Primary Examiner*—Terry Lee Melius
*Assistant Examiner*—Robert Pezzuto
*Attorney, Agent, or Firm*—Heslin & Rothenberg, P.C.

[57] ABSTRACT

A convertible garden tiller includes a chassis, a pair of wheels supporting the chassis, an engine mounted on the chassis capable of driving the wheels in a given direction and a plurality of earth working tines. Each tine is generally unidirectional, having a preferred direction of movement through the earth and is disposed on an elongated tine shaft which rotates about a longitudinal axis in response to operation of the engine. The tine shaft is also pivotable 180 degrees about a transverse axis, to selectively rotate the tines in the given direction as well as the second direction. This construction therefore provides that each tine moves through the earth only in its preferred direction of movement. The tiller also includes guide handles which are selectively pivotable from a position above the tines to a position above the wheels for alternately converting from a rear tine mode to a front tine mode. The wheels are driven by the engine when the guide handles are disposed in the rear tine mode and are automatically disengaged from the engine when the handles are pivoted to convert the tiller to the front tine mode. Further, the tines are replaceable with other implements such as an edger, aerator, power rake, snow-thrower or sickle bar.

60 Claims, 18 Drawing Sheets

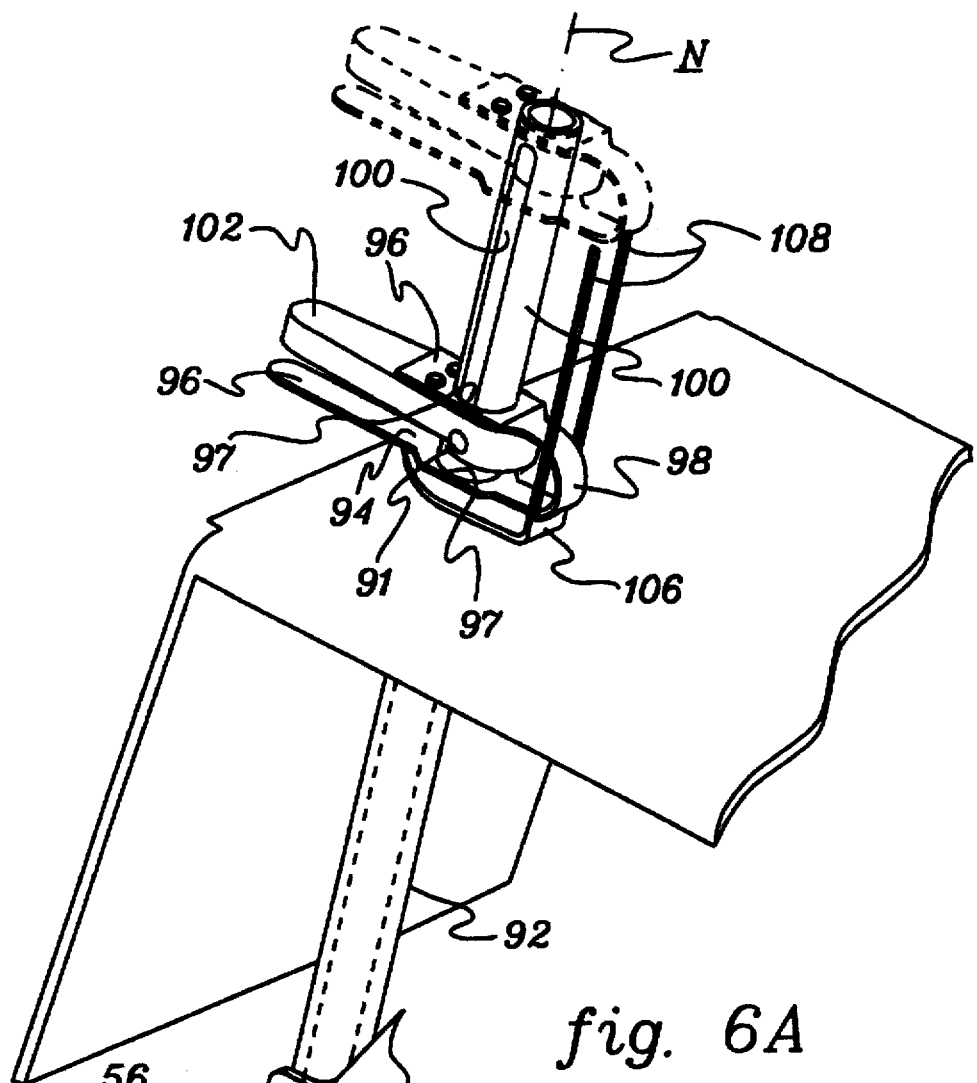
fig. 6A
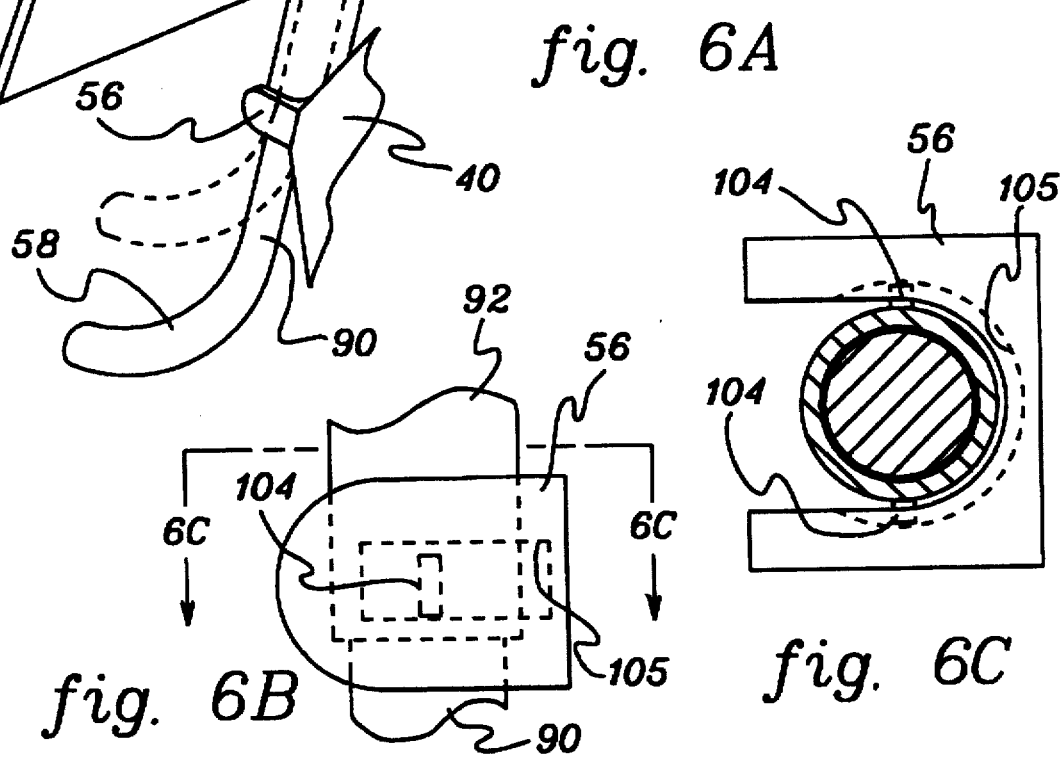
fig. 6B
fig. 6C

CONVERTIBLE GARDEN TILLER

BACKGROUND OF THE INVENTION

1. Field of the Invention

This invention relates to lawn and garden equipment and more particularly to a tiller which is convertible to selectively operate in front tine and rear tine configurations, as well as in both SRT and CRT modes.

2. Background Information

Several types of garden tillers exist for performing various tilling operations in gardens, flower beds, lawns and the like. Examples of these types include rear tine SRT ("standard rotating tine") tillers, rear tine CRT ("counter rotating tine") tillers and front tine tillers, also commonly referred to as cultivators. While each of these devices will till the earth, each particular construction is optimized for discrete operating conditions or operations.

One type of tiller is known as a rear tine SRT tiller. This machine typically includes power driven drive wheels, power driven tines and a handle which extends over the tines. Thus, during operation, the tines are located between the drive wheels and the operator. The designation SRT indicates that the tines rotate in the same forward direction as the drive wheels and thus cooperate with the wheels to propel the tiller forwardly. These types of tillers are best suited for tilling previously tilled soil or light sandy soil. SRT tillers are also very well suited for power composting.

Rear tine SRT tillers are not however, without their drawbacks. In particular, these machines are not particularly well suited for tilling hard soil, as the tines tend to skip and till only to a very shallow depth. In addition, they tend to be cumbersome and difficult to maneuver in tight areas, such as around existing plants or other obstacles.

Another type of tiller is known as a rear tine CRT tiller. This machine is structurally similar to the rear tine SRT tiller, with the exception that the tines rotate in the opposite direction, namely, opposite to the direction of rotation of the drive wheels. This construction solves some of the problems associated with the SRT tiller described hereinabove, namely, the tines penetrate to a deep depth even in hard soil or soil which has not been tilled previously. A general disadvantage however, of this approach is that the drive wheels tend to lose traction relative to the deep digging "counter rotating" tines. As a result, the tiller may stop moving forward or may even be pulled rearwardly against the forward pull of the drive wheels. Consequently, such tillers are generally very large and heavy, commonly in excess of 200 pounds, to provide the wheels with sufficient traction to consistently overcome the rearward pull of the tines. A drawback of such large machines however, is that they can be inefficient and cumbersome to operate for relatively light duty tilling, such as home garden use or other small area tilling. CRT tillers are also not suited for power composting.

A further type of tiller is known as a front tine tiller or cultivator. Such a machine typically includes a pair of non-driven wheels, power driven tines and a handle which extends over the wheels. During operation, the wheels are located between the tines and the operator and the tines rotate in the forward direction to propel the tiller forwardly. This type of tiller tends to be highly maneuverable and ideally suited for relatively light duty operations such as tilling small areas or areas between and around plants or other obstacles. The front tine tiller however, is not the best choice for routine tilling operations since the wheels trail the tines and therefore tend to leave tracks or ruts in the freshly tilled earth.

Rather than necessitate owning a separate machine for each of the above described tilling operations, it is desirable to have a single machine capable of operating effectively in more than one mode. For example, it would be convenient to provide a single tiller which is capable of operating in both rear tine SRT and CRT modes for effectively tilling both previously tilled earth, as well as hard packed soil. This may conceivably be accomplished by providing a reversing transmission for selectively changing the direction of rotation of the tines. A significant drawback of this approach however, is that the best performing tines tend to be unidirectional, having a preferred direction of movement through the soil. Generally speaking, such tines have convex leading edges and concave trailing edges. The convex leading edge serves to smoothly cut into and lift the soil while effectively allowing roots and grass to slide off the tine. Using a transmission to simply shift the tines into reverse rotation results in the tines moving through the soil leading with the concave, rather the convex surface. Such backwards movement is undesirable because the concave surface tends to snag and become entangled in roots, grass and other debris. Accordingly, this approach produces an inefficient CRT tiller.

It is, therefore, desirable to provide a single tilling machine that can be quickly and easily converted by a user to several different operating modes, including both front and rear tine operation, as well as SRT and CRT tine rotation, while moving the tines through the earth only in their preferred direction of movement.

SUMMARY OF THE INVENTION

According to one embodiment of the invention, a convertible garden tiller includes a chassis, at least a pair of ground engaging wheels supporting the chassis, an engine mounted on the chassis capable of driving said wheels in a given direction and earth working tines disposed on the chassis to rotate in response to operation of the engine. Each tine has a preferred direction of movement through the earth and the tines are selectively rotatable in the given direction and in a second direction opposite to the given direction, while each tine moves through the earth only in its preferred direction of movement.

According to a second embodiment of the invention, a convertible garden tiller includes a chassis, at least a pair of ground engaging wheels supporting the chassis, an engine mounted on the chassis, earth working tines disposed on the chassis to rotate in response to operation of said engine and a depth regulator by which the earth working tines are maintained at a predetermined depth in the earth during tilling operations. A hood is disposed over the tines, the hood being disposed integrally with the depth regulator.

According to a third embodiment of the invention, a convertible garden tiller includes a chassis, at least a pair of ground engaging wheels supporting the chassis, and guide handles disposed on the chassis by which an operator may guide the tiller. An engine is mounted on the chassis for selectively driving the wheels in a given direction, earth working tines are disposed on the chassis to rotate in response to operation of the engine, and the handles are selectively pivotable from a position above the wheels to a position above the tines for selectively converting from a front tine to a rear tine tiller. The ground engaging wheels are selectively drivingly engaged by the engine in response to the pivotable movement of the handles.

3

The above and other advantages of this invention will be more readily apparent from a reading of the following description of an exemplary embodiment thereof taken in conjunction with the following drawing.

BRIEF DESCRIPTION OF THE DRAWINGS

FIG. 6A is a perspective view of a portion of the tiller of FIGS. 1-4, with portions thereof in phantom;

FIG. 6B is a plan view of a portion of the tiller of FIG. 6A;

FIG. 6C is a cross-sectional view taken along 6C—6C of FIG. 6B;

DETAILED DESCRIPTION OF THE PREFERRED EMBODIMENT

Figure 1:
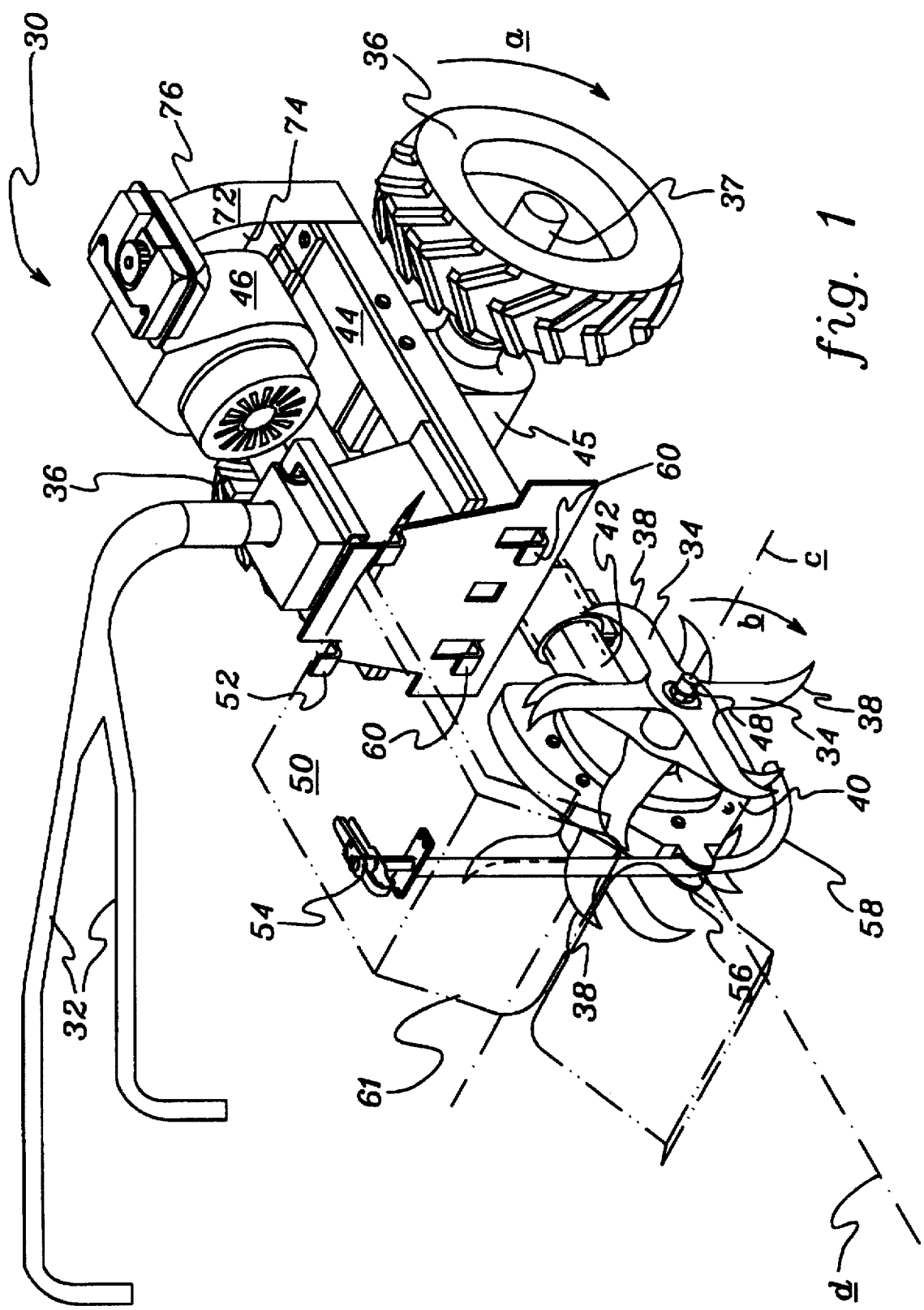
FIG. 1 is perspective view of the tiller of the present invention in the rear tine SRT mode.
Figure 2:
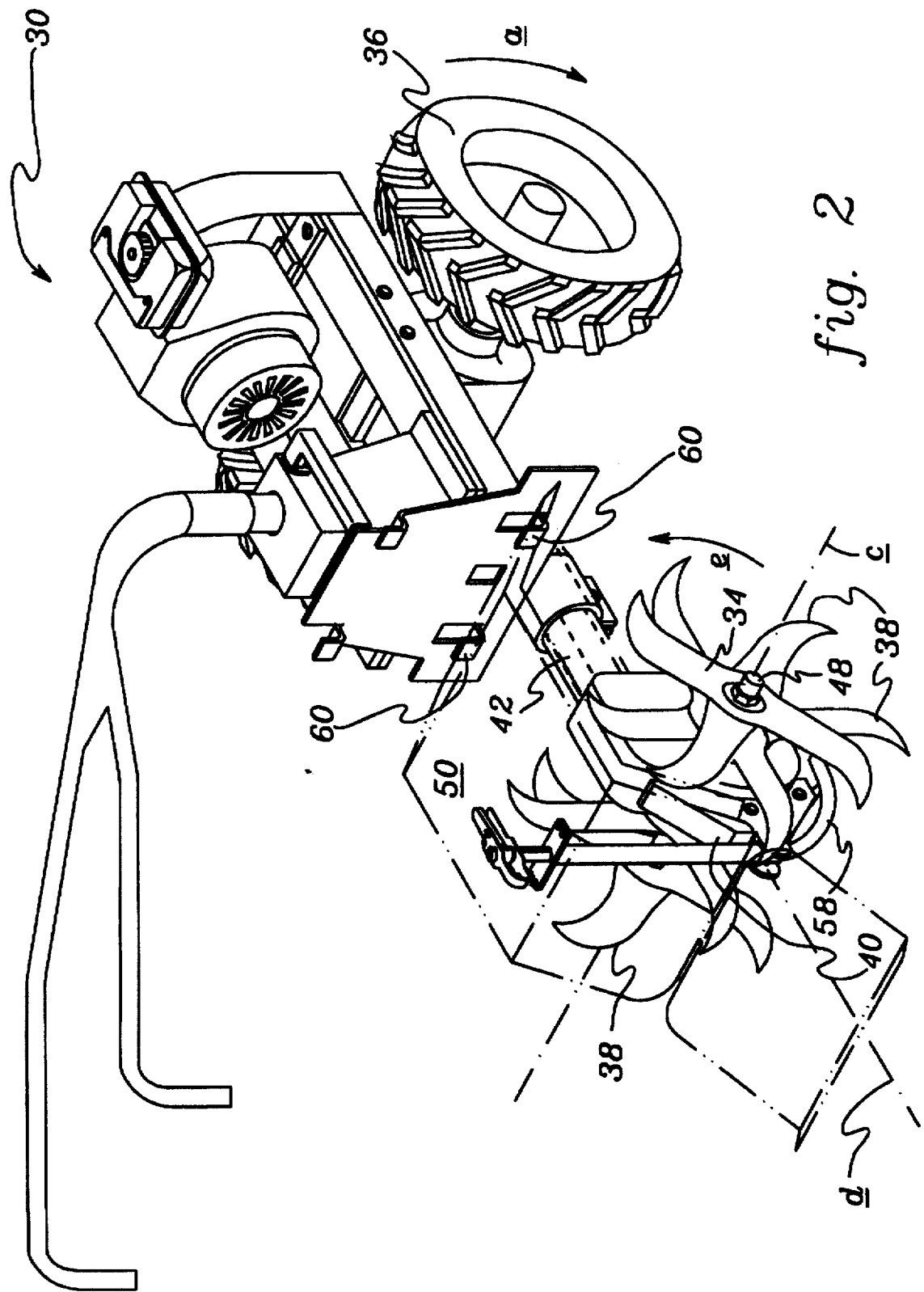
FIG. 2 is a view similar to that of FIG. 1, with the tiller in rear tine CRT mode.
Figure 3:
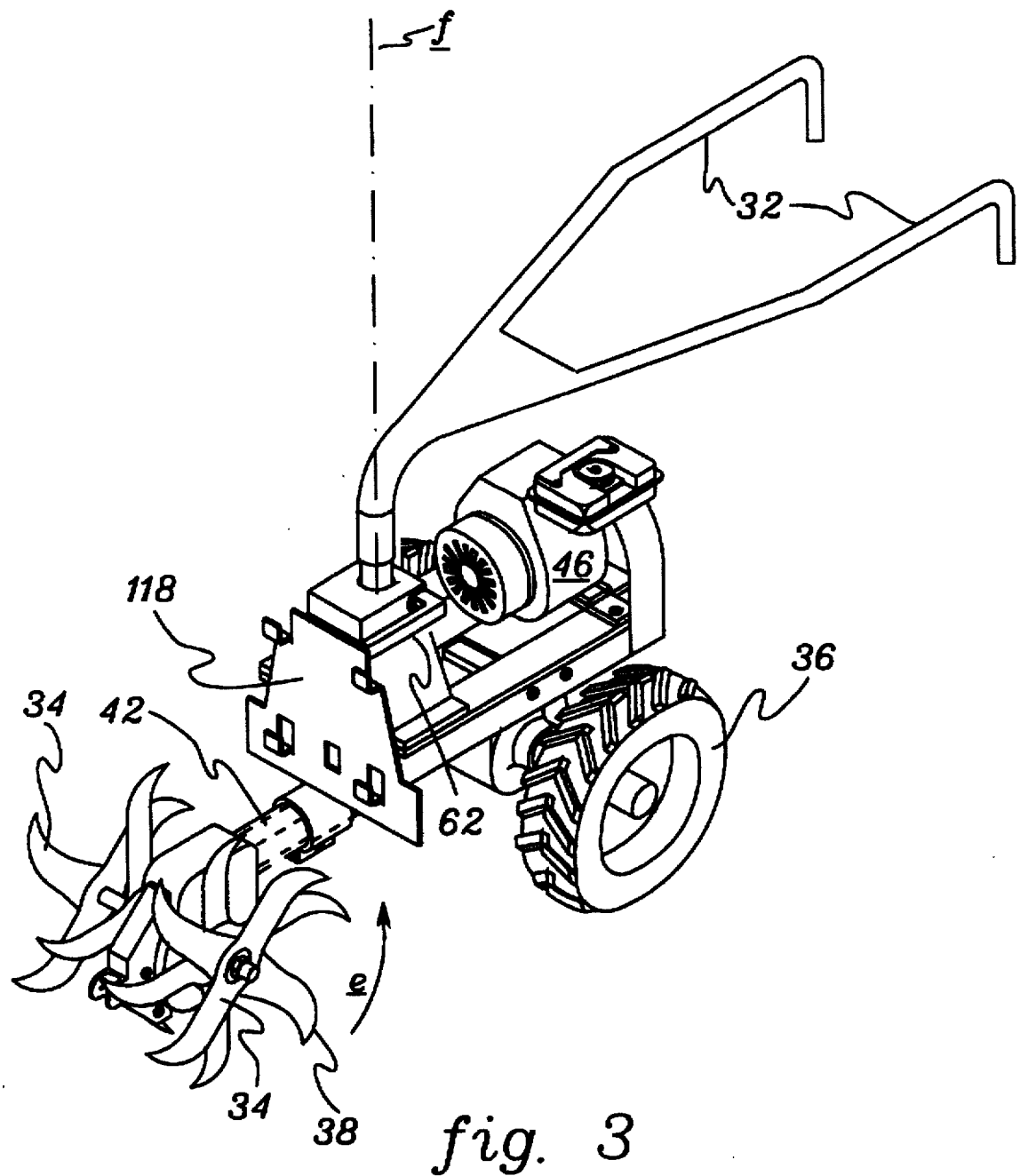
FIG. 3 is a view similar to that of FIG. 2, with the tiller in front tine mode.

Briefly summarized, as shown in FIGS. 1-3, the invention generally comprises a single tiller 30 which is selectively convertible to operate in at least three discrete modes. The first mode, (FIG. 1) is that of a rear tine SRT tiller. In this mode handles 32 are disposed over tines 34, wherein during operation, the tines are disposed between wheels 36 and the operator or user. In this mode, the tines rotate in the same direction as the wheels and each individual tine moves through the earth in the preferred direction of movement, leading with convex leading edge 38. In a second mode, (FIG. 2) tiller 30 has been converted to a rear tine CRT tiller in which the tines remain disposed between the wheels and the operator. However, in this mode, the tines "counter rotate" in a direction opposite that of the wheels. Although the rotation has been reversed, each individual tine still moves through the earth in the preferred direction of movement, leading with convex leading edge 38. This action has been accomplished by rotating power take off gearbox 40 about output shaft housing 42 as will be discussed in detail hereinafter. In a third mode, (FIG. 3) tiller 30 has been converted to a front tine tiller or cultivator. This conversion was accomplished by pivoting the handles 180 degrees about a vertical axis to dispose wheels 36 between tines 34 and the operator. The pivotal movement of the handles serves to automatically disengage the wheels from the engine. The tiller is thereby propelled along the ground by rotation of the tines. The tines rotate in the CRT direction, while each individual tine still moves through the earth in the preferred direction of movement, namely leading with convex leading edge 38.

Referring in detail to FIG. 1, tiller 30 of the present invention includes a chassis 44 which is supported by a pair of ground engaging wheels 36 disposed on a wheel axle 37. An engine 46 is disposed on the chassis and serves to drive wheels 36. In a preferred embodiment, the engine is disposed in such a manner that a horizontally disposed engine output shaft (not shown) extends into a pulley housing 72, wherein a pulley or sprocket disposed on the engine output shaft drives a belt or chain (not shown) engaged with an input shaft (not shown) of a transmission 45. The transmission drives wheel axle 37, which in turn drives the wheels in the direction indicated by arrow a to propel the tiller in a forward direction. For purposes of clarity, throughout this disclosure the reverse direction shall refer to the direction in which handles 32 extend and the forward direction shall refer to the direction opposite thereto.

As shown, engine 46 is disposed directly over the wheels, wherein nominally the full weight of the engine is applied to the wheels for aiding traction. This contrasts from typical prior art rear tine tiller construction in which the engine is cantilevered forward of the wheels to counterbalance the weight of the machine in an effort to make such heavy machines easier to handle for the average user. Such cantilevered construction has generally been accomplished by disposing the engine in front of the pulley housing 72, with the engine output shaft extending in the rearward direction to engage the pulley housing from forward or outboard side 76 thereof.

By contrast, the orientation of the present invention is accomplished by reversing the orientation of the engine 180 degrees relative to the prior art. In this manner, the engine output shaft operatively engages pulley housing 72 from the rearward or inboard side 74 thereof, rather than from outboard side 76.

Referring back to FIG. 1, a transmission output shaft 47 (FIG. 4) which will be discussed hereinafter, is rotatably driven by transmission 45 about axis d and is disposed within an output shaft housing 42. The output shaft housing extends longitudinally from chassis 44 and terminates at gearbox 40. The gearbox rotatably supports a tine shaft 48 on which the tines 34 are rigidly disposed. The tine shaft, including tines 34, is rotatable in the SRT direction (indicated by arrow b) about axis c.

Hood 50 is disposed over the tines 34 and is secured on one end thereof by engagement with upper slots or hooks 52 of the chassis. An elongated depth regulator 54 is integrally disposed on hood 50, extending orthogonally therefrom to releasably engage a nose or bracket 56 of the gearbox 40 to fully secure the hood in position. The depth regulator and hood attachment will be discussed in greater detail hereinafter. Depth regulator 54 has a curved lower portion which terminates in a lower end 58 disposed in a substantially horizontal position for engaging the earth during operation of the tiller. Lower end 58 points away from the chassis in the reverse direction during such operation. The hood also comprises a hinged extension 61 disposed thereon which serves to adjustably maintain the hood in contact with the ground regardless of the height at which the hood is disposed on the tiller. Thus, the depth regulator may be adjusted to various depths and the hood may be disposed in either upper hooks 52 or lower hooks 60 (as will be discussed hereinafter) and still serve to protect a user from unintentionally contacting the tines during tilling operations.

Referring now to FIG. 2, gearbox 40 has been pivoted 180 degrees about axis d to dispose tines 34 for rotation in the CRT direction, as indicated by arrow e. In this mode of operation, tine shaft 48 and accordingly, tines 34 are disposed at a lower position relative to the chassis as a consequence of the vertical offset between the axes c and d which will be discussed hereinafter. The hood 50 is thus disposed in lower slots or hooks 60. The specific engagement of hood 50 with the slots or hooks will be discussed in greater detail hereinafter.

This rear tine CRT tiller construction tends to contradict the teachings of the prior art. Namely, the present invention is relatively lightweight, weighing nominally less than 100 pounds. This is less than half the weight conventionally believed necessary to provide a functional rear tine CRT tiller, as discussed hereinabove. Unexpectedly, however, it has been found that the lightweight design of the present invention (resulting from the construction to be described hereinafter), operates successfully as a rear tine CRT tiller.

Additionally, contrary to conventional wisdom, the tiller of the subject invention has been shown to be easy to operate even without the counterbalancing typically provided by cantilevering the engine in front of the wheels. Indeed, the user may easily eliminate any wheel spin that does occur by simply applying a light upward force to the handles. This action serves to lift the tines slightly, thereby reducing the "bite" of the tines in the earth, thereby enabling the wheels to regain traction and pull the machine forward. The present construction, therefore, provides the surprising results of operating successfully in the rear tine CRT mode, while weighing less than half that of prior art CRT tillers.

Throughout this disclosure, directional indications such as downward and upward, when used in reference to the present invention and parts thereof, shall refer to the tiller when disposed in normal operating orientation on level ground.

Referring now to FIG. 3, a cam lock device 62 is disposed on an upper surface of chassis 44 for selectively releasing and engaging handles 32 for raising and lowering the handles as well as for enabling the handles to be pivoted about vertical axis f. Cam lock device 62 can be manipulated by the operator using a single hand. The specific construction and operation of the cam lock device will be discussed in detail hereinafter. As mentioned hereinabove, wheels 36 have been automatically disengaged from the engine in response to the pivotal movement of the handles and the tiller is therefore propelled solely by the rotation of the tines in the CRT direction (arrow e). Means for automatically disengaging the wheels will be discussed in greater detail hereinafter. In a preferred embodiment, hood 50 is not disposed over the tines when in this front tine tiller mode and a hood interlock (not shown) of a conventional mechanical or electromechanical construction is preferably disposed to prevent operation of the tiller in the event the user attempts to engage the hood in this mode. This feature thereby serves to prevent hinged extension 61 (FIG. 1) of the hood from catching on the ground and interfering with operation of the tiller during front tine operation. One possible embodiment of the hood interlock may include an electric circuit having switches which change state in response to movement of the hood and handles, to thus deactivate the engine in the event the user attempts to operate the tiller in the front tine mode without removing the hood.

An additional safety feature includes a stop or kill switch (not shown) employed to prevent operation of the tiller in the event the handles are rotated to the front tine position when in the SRT mode. This feature may simply comprise conventional means such as that described hereinabove with reference to the hood interlock, i.e. an electric circuit comprising switches which change state in response to movement of the handles and the shaft housing. In this regard, a lug may be disposed on the output shaft housing 42 which would therefore rotate with the gearbox and shaft housing 42 when pivoting between the SRT and CRT positions, to selectively engage a switch disposed on the tiller.

Figure 4:
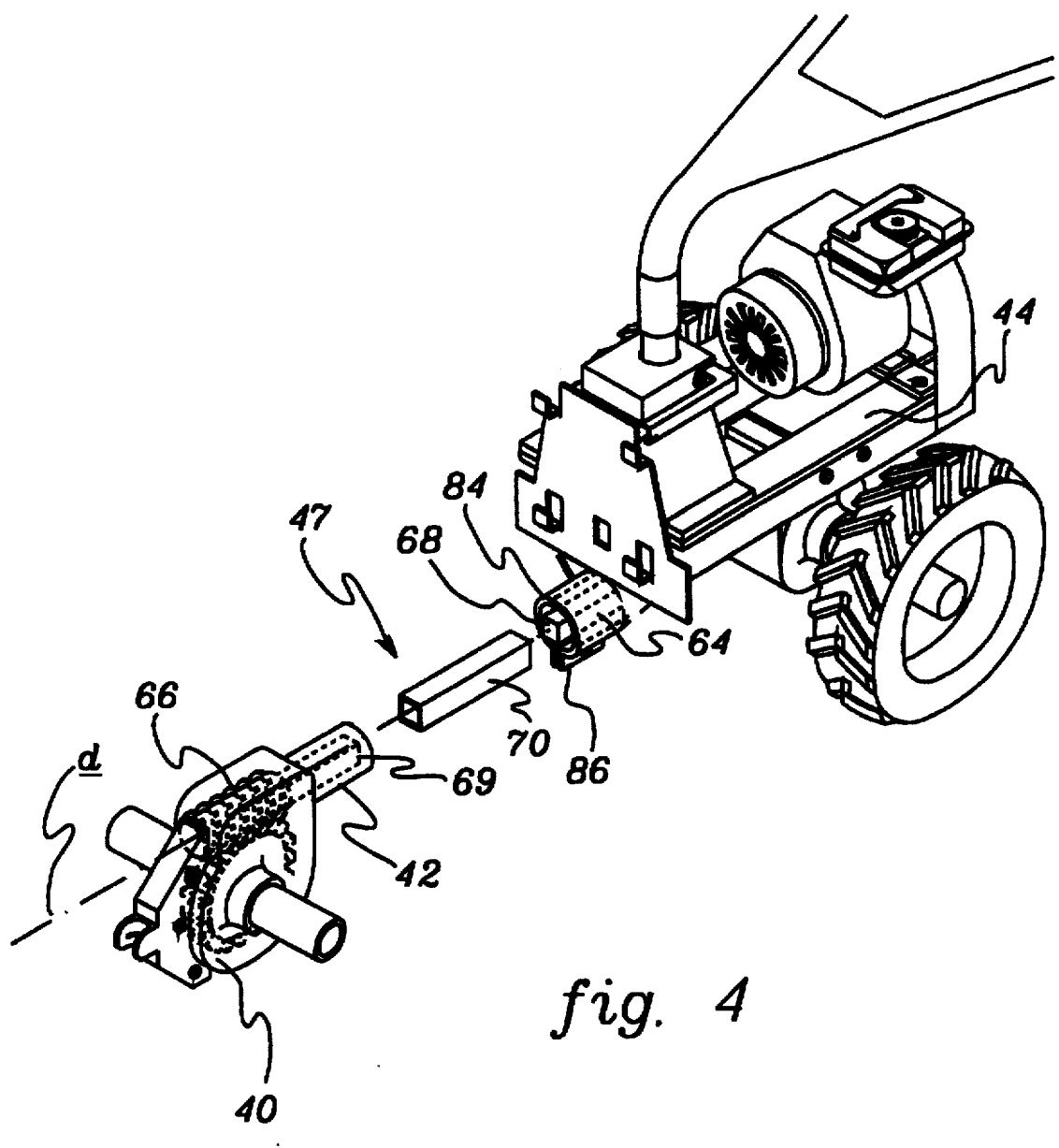
FIG. 4 is an exploded perspective view of the tiller of FIG. 3 without the tines.

Referring now to FIG. 4, output shaft 47 preferably comprises first and second end portions 64 and 66, respectively. The first end portion extends from the chassis towards gearbox 40 and the second end portion is disposed on the gearbox and extends towards the chassis. Each end portion 64 and 66, has an engagement knob 68 and 69, respectively, disposed thereon, of preferably square cross-section. The output shaft also comprises a third intermediate portion 70 which preferably comprises a hollow tube having a cross-section (preferably square) that compliments the cross-sectional shape of the engagement knobs 68 and 69 to slidably receive the knobs therein, while preventing rotation of the first and second end portions 64 and 66, relative to one another, about axis d. When so received, the second end portion of output shaft 47 will necessarily rotate with the first end portion, while allowing relative longitudinal movement therebetween to facilitate easy removal of the gear box from the tiller, as will be discussed hereinafter.

One skilled in the art will readily recognize that the first and second end portions as well as the third intermediate portion, may have any cross-sectional shape, as long as the shape is asymmetrical about longitudinal axis d.

As also shown, output shaft housing 42 is releasably received by a receptacle 84 disposed on chassis 44. The receptacle comprises a collar clamp having a pair of flanges 86 through which a releasable fastener, such as a threaded bolt (not shown) may pass. The fastener may be selectively tightened and loosened to allow the flanges to move towards and away from one another to thereby clamp and release housing 42. In this manner, the output shaft housing may be selectively rotated about axis d.

Figure 5A:
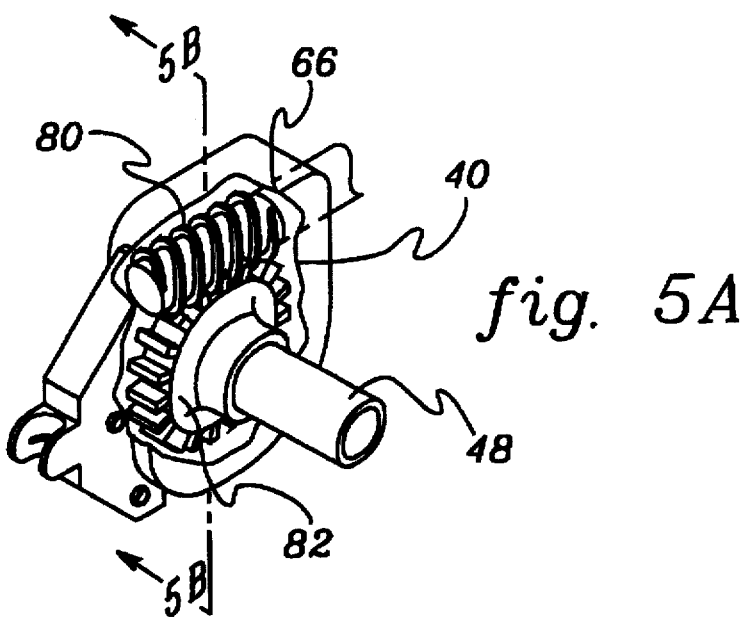
FIG. 5A is a broken away perspective view of the gearbox of the tiller of FIG. 4.

Referring now to FIG. 5A, power take off gearbox 40 comprises a worm gear 80 disposed on second end portion 66 of transmission output shaft 47 (FIG. 4). The worm gear operatively engages worm wheel 82 drive tine shaft 48 and thereby effect the aforementioned rotation of tines 34.

Figure 5B:
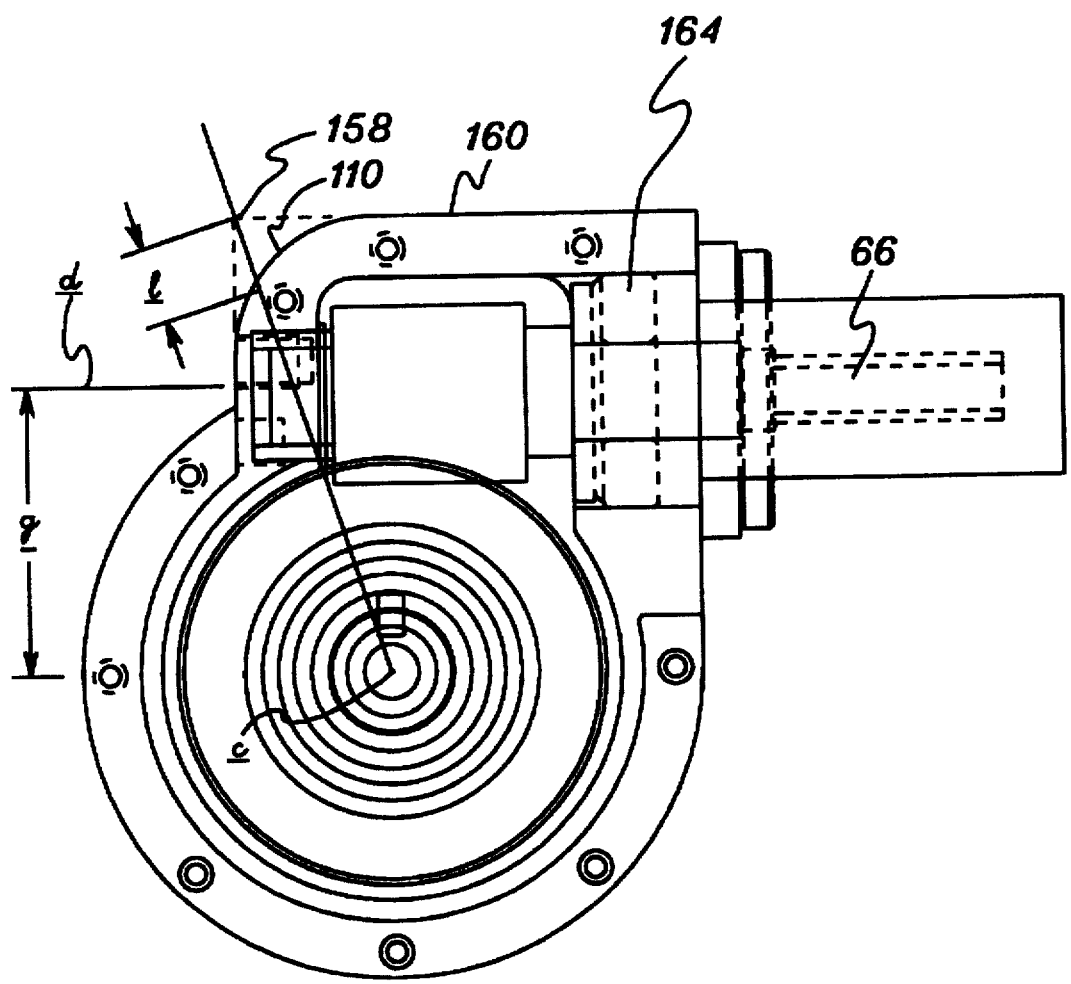
FIG. 5B is cross-sectional plan view, with portions removed, taken along 5B—5B of FIG. 5A.

As best shown in FIG. 5B, the use of the worm gear and worm wheel serves to minimize the offset or distance g between the axis d of transmission output shaft 47 and the axis c of tine shaft 48. Minimizing this offset is critical in order to provide adequate clearance between the ground and gearbox 40 when the tiller is disposed in the SRT mode of FIG. 1.

It has also been found that an important feature contributing to ground clearance in the SRT mode is the replacement of square corner 158 (shown in phantom), which would normally be present in the gearbox, with the radiused surface 110. As shown, this feature serves to reduce the radial distance between axis c and the outer most surface of gearbox 40 by approximately 0.5 inches as indicated by distance 1, measured along a line connecting axis i and corner 158 as shown. During operation of the tiller in the SRT mode, transmission output shaft 47 extends from chassis 44 at an oblique angle towards the ground. Accordingly, when tilling at a maximum depth, the gearbox slides along the ground along radiused surface 110, rather than along generally planar surface 160. Ground clearance is thus increased by between approximately 60–100 percent of distance 1, depending on the angle at which axis d of shaft 47 is disposed relative to the ground. One skilled in the art will recognize that the angle of axis d and thus the amount of ground clearance ultimately gained by the elimination of corner 158 is a function of the length of transmission output shaft 47 as well as the diameter of wheels 36.

Referring now to FIG. 6A, a preferred embodiment of depth regulator 54 comprises an elongated cylindrical shaft 90 concentrically and slidably disposed within a generally cylindrical sleeve 92. The sleeve extends through and is rotatably disposed to hood 50 wherein the sleeve may rotate about its longitudinal axis n but is prevented from moving longitudinally relative thereto. A portion of the sleeve extends above the hood a predetermined distance and a pair of diametrically opposed slots 100 are disposed longitudinally along substantially the entire length of the portion of the sleeve above the hood. A spring clip 94 is fastened to an upper end of shaft 90 and is selectively engageable with the sleeve to adjust the position of the shaft relative thereto. Spring clip 94 comprises a pair of elongated generally parallel legs 96 which depend from a resilient bight 98 which serves to bias the legs away from one another. Each leg 96 has a generally circular aperture or opening 97 disposed therein which is sized to permit sleeve 92 to pass therethrough when the legs are compressed against their bias towards a generally parallel orientation, and to bind against sleeve 92 when the legs are released and biased away from one another. Openings 97 preferably have a diameter of between approximately 110 percent and 140 percent of the diameter of said shaft. The spring clip is fastened to shaft 90 by a pin 91 fastened to clip 94 proximate one of the legs and which passes across opening 97, through the slots 100 and through a bore (not shown) of shaft 90. In a preferred embodiment, a grip portion 102 is rigidly fastened in a conventional manner to an uppermost leg 96 and the pin is disposed thereon. This construction permits the user to selectively adjust the height of the depth regulator between a lower or down position as shown and an upper or up position as shown in phantom. This adjustment is accomplished simply by grasping the spring clip about the legs, (including grip portion 102) selectively compressing legs 96 towards one another, sliding spring clip along the length of sleeve 92 to the desired elevation, and releasing the legs to secure shaft 90 in position. In this manner, depth regulator 54 is infinitely adjustable since spring clip 94 may be secured at substantially any position along the length of the portion of sleeve 92 that extends above hood 50. This construction contrasts with conventional configurations which rely upon a series of discrete detents to provide elevational adjustment.

Also disposed on hood 50 is a generally planar U-shaped fork 106 which comprises a pair of generally parallel prongs 108 that depend orthogonally from the hood in an upwards direction. Bight 98 is disposed between prongs 108 during substantially the entire range of motion of the spring clip along the length of sleeve 92. Accordingly, fork 106 serves to prevent unintended rotation of sleeve 92 as will be discussed hereinafter. Bight 98 will however clear the prongs 108 when spring clip 94 is disposed in the upper position as shown in phantom, to permit rotation of the sleeve.

Sleeve 92 extends downwardly from hood 50 a predetermined distance terminating at a lower end at which a pair of diametrically opposed keys 104 extend orthogonally therefrom. Each of the keys are selectively engageable with an annular trough 105 disposed on an inner surface of a U-shaped nose or bracket 56 in response to rotation of sleeve 92 about its axis. This sleeve rotation occurs when the user rotates spring clip 94 about axis n, which will be discussed in greater detail hereinafter with respect to the operation of the present invention. As shown, the keys are preferably both engaged with the trough when the depth regulator is properly disposed on the bracket.

Figure 7:
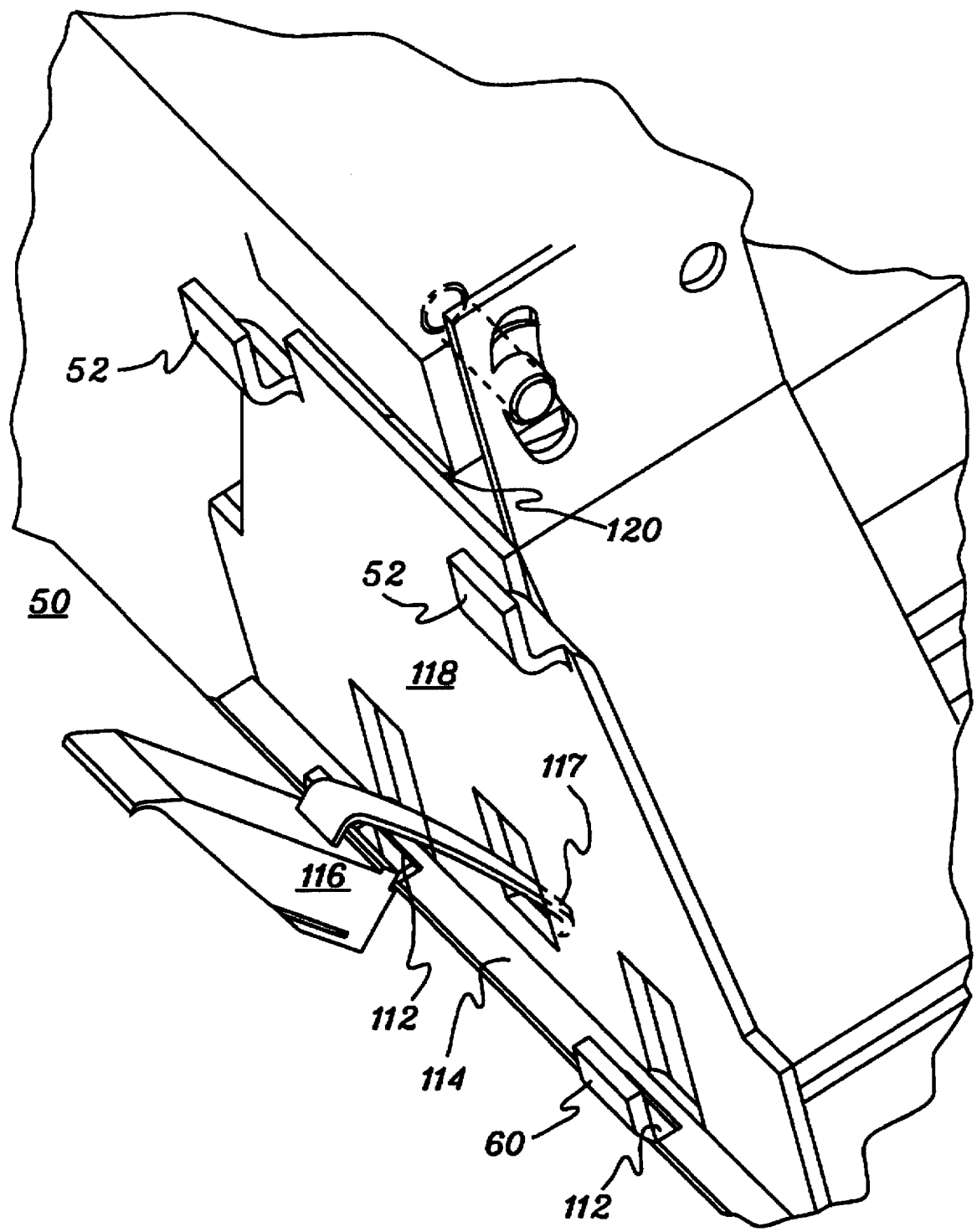
FIG. 7 is a perspective view, with portions shown in phantom, of a portion of the tiller of FIG. 2.

Referring now to FIG. 7, hooks 60 preferably pass through openings 112 disposed in a flange 114 of hood 50. A latch 116, which for example, may conveniently be a 300 Series latch, Part Number V3-0072-07, sold by Southco, Inc., having a hooked blade 117, is disposed on the hood proximate flange 114. Blade 117 is thereby engageable with a lower catch (not shown) of hook plate 118 to secure hood 50 thereto. Although the lower catch is not shown, it comprises an extension or protrusion that extends from hook plate 118 in a manner substantially identical to upper catch 120. Hood 50 may be secured to upper hooks 52 in a similar manner, with the blade 117 of latch 116 engaging upper catch 120.

Figure 8:
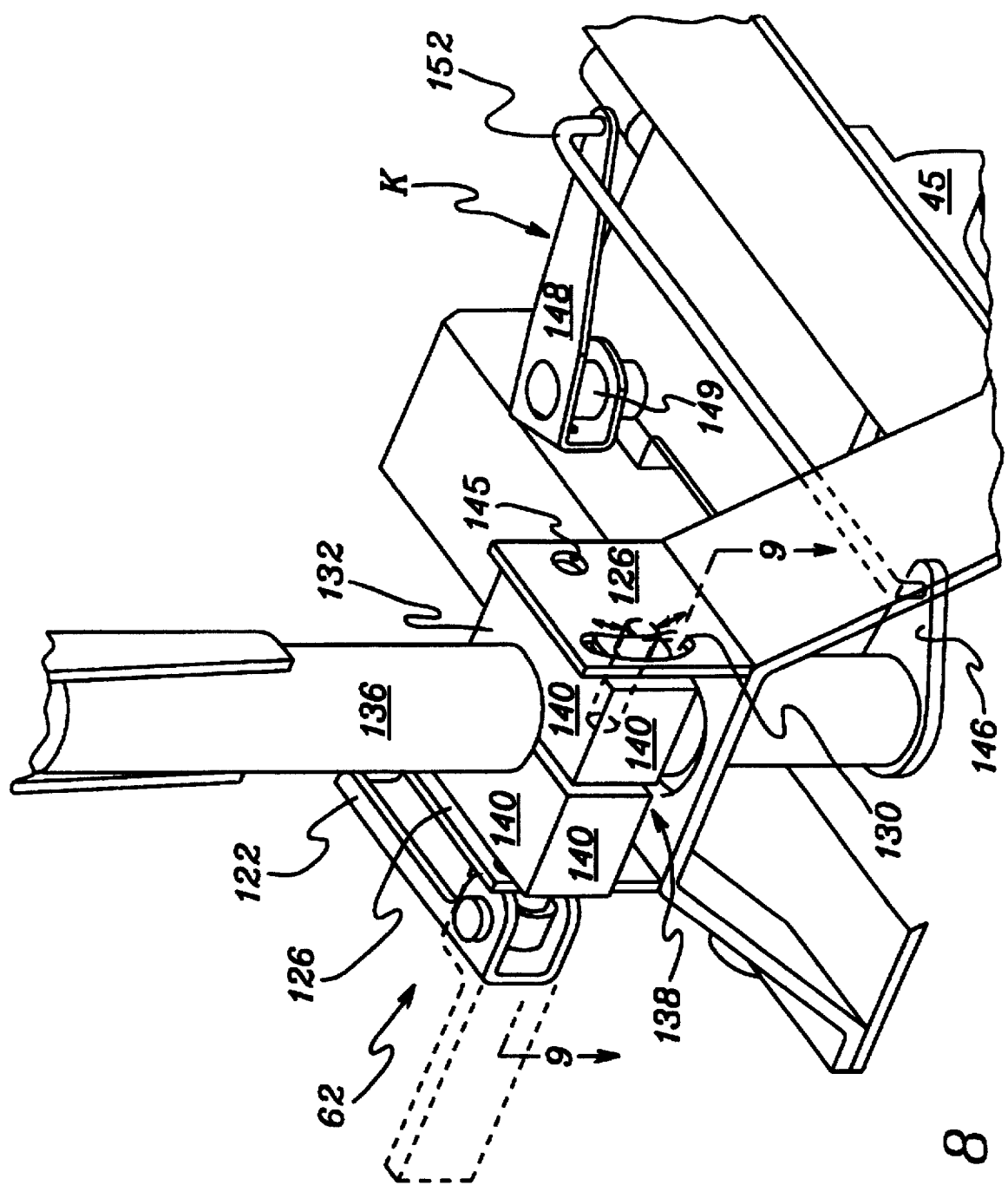
FIG. 8 is a perspective view, with portions shown in phantom, of the tiller of the present invention in the wheel engage mode of FIGS. 1 and 2.
Figure 9:
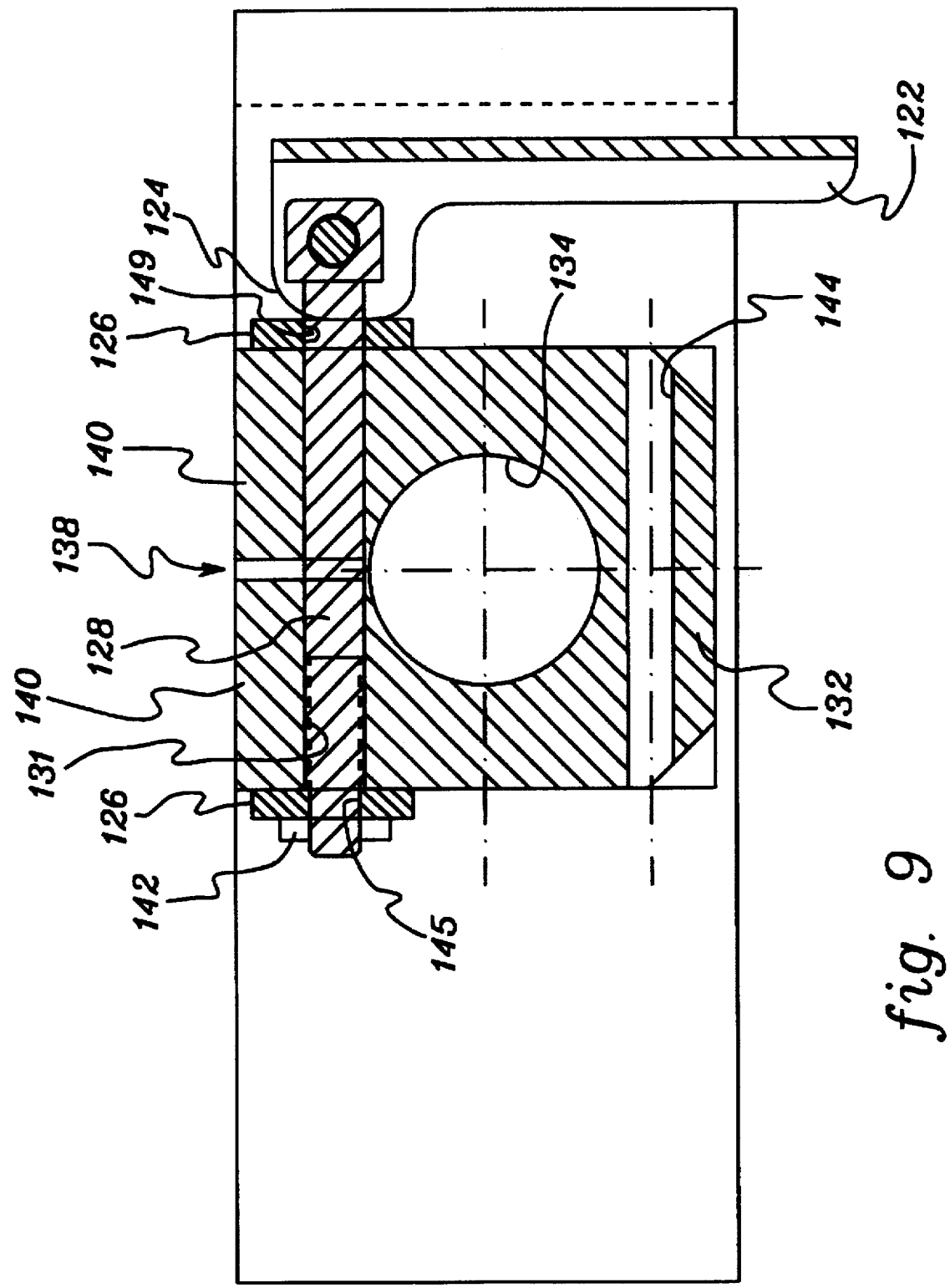
FIG. 9 is a cross-sectional view taken along 9—9 of FIG. 8.

Referring now to FIGS. 8 and 9, cam lock device 62 generally comprises a conventional "quick release" type fastener having a handle 122 which is selectively pivotable between a fastened position as shown, and a release position as shown in phantom (FIG. 8). The cam lock device may comprise any number of conventional forms comprising a handle which is pivotable to selectively clamp and release a cylindrical member. One suitable embodiment is briefly described as follows.

Handle 122 is pivotably connected to a pin 128 which slidably passes through elongated slots 130 (FIG. 8) disposed in stanchions 126 and through a bore 131 (FIG. 9) disposed in a collar 132. As best shown in FIG. 9, collar 132 comprises a block having a generally cylindrical bore 134 extending therethrough which slidably receives cylindrical base 136 of handles 32. Collar 132 does not extend a full 360 degrees about base 136, but rather is provided with a gap 138 on one side thereof to form a pair of discrete arms 140 which are movable relative to one another to selectively engage and release base 136. A fastener, such as a threaded nut 142 (FIG. 9) is disposed on an end of pin 128 opposite that of handle 122. Handle 122 comprises a cam surface 124 having a progressively increasing radius, which, in a manner known to one skilled in the art, serves to cam stanchions 126 towards one another when handle 122 is moved from the release position to the fastened position. Such movement of the stanchions will in turn compress arms 140 towards one another to engage and secure base 136.

Additionally, collar 132 further comprises a bore 144 (FIG. 9). A pivot pin (not shown) extends through bore 144 and a pair of bores 145 (FIGS. 8 and 9) disposed in stanchions 126 to pivotably secure collar 132 thereto. Accordingly, when handle 122 is released, collar 132, and therefore, base 136 of handles 32, is permitted to be pivoted about bore 144 wherein pin 128 will travel within slots 130. In this manner, the user may selectively raise and lower handles 32 and also rotate base 136 about axis f (FIG. 3) to move handles 32 between the aforementioned front tine and rear tine configurations. Once the handles are disposed in the desired configuration, handle 122 is moved to the fastened position. The user is thus able to adjust both the height of handles 32, as well as convert between front to rear tine operation, using a single hand, without the use of tools, simply by manipulation of a single fastener.

As mentioned hereinabove, wheels 36 (FIGS. 1–4) will not be driven when the tiller is in the front tine mode. Accordingly, in a preferred embodiment, the wheels will be automatically disengaged from the engine when the tiller is converted to the front tine mode. A variety of embodiments may be utilized to accomplished this, one of which is shown in FIGS. 8 and 10–14.

Referring back to FIG. 8, a handle lever 146 depends orthogonally from base 136 of handles 32. A link 152 extends therefrom and is pivotably connected to transmission lever 148. Lever 148 is pivotably disposed on a transmission shaft 149 which depends upwardly from transmission 45. Handle lever 146 pivots in response to rotation of the handles about axis f (FIG. 3) which in turn, moves link 152 to pivot transmission lever 148 in tandem with the handle lever. The levers 146 and 148 are oriented as shown when the tiller is disposed in the rear tine configuration of FIGS. 1 & 2. The levers are pivoted in the direction indicated by arrow K to the positions shown in FIG. 10 upon rotation of the handles to the front tine configuration. When so pivoted, the engine is disengaged from the wheels as mentioned hereinabove. A specific mechanism for accomplishing this disengagement will be discussed hereinafter.

Figure 10:
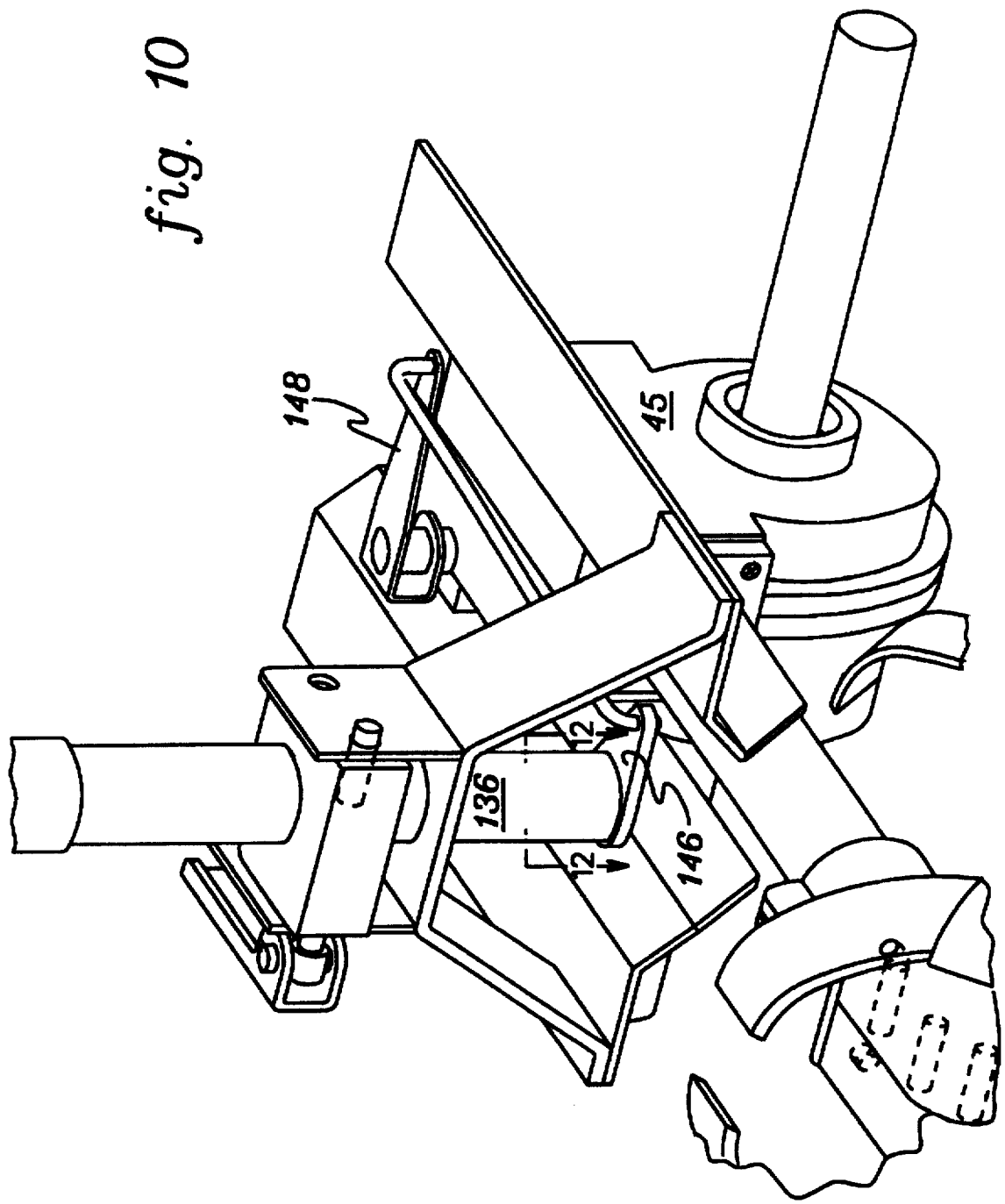
FIG. 10 is a view similar to that of FIG. 8, of the tiller of the present invention in the wheel disengage mode of FIG. 3.

As shown in FIGS. 8 and 10, levers 146 and 148 generally rotate along an arc of less than 180 degrees and preferably between 10–35 degrees. Base 136, however, as discussed hereinabove, rotates a full 180 degrees. This disparate rotation is provided by the construction shown in FIGS. 11 and 12.

Figure 11:
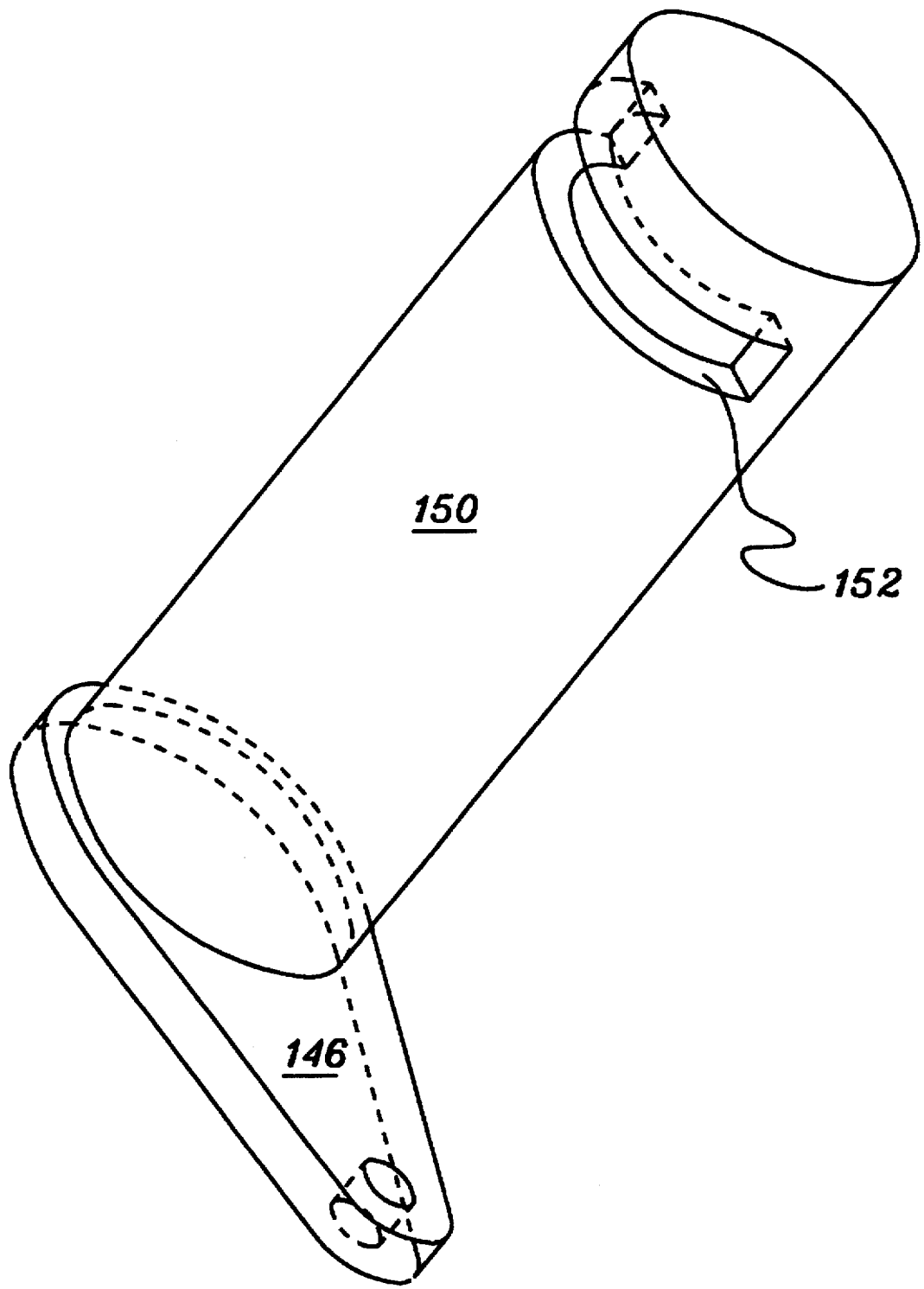
FIG. 11 is a perspective view of a portion of the tiller of FIGS. 8 and 10.
Figure 12:
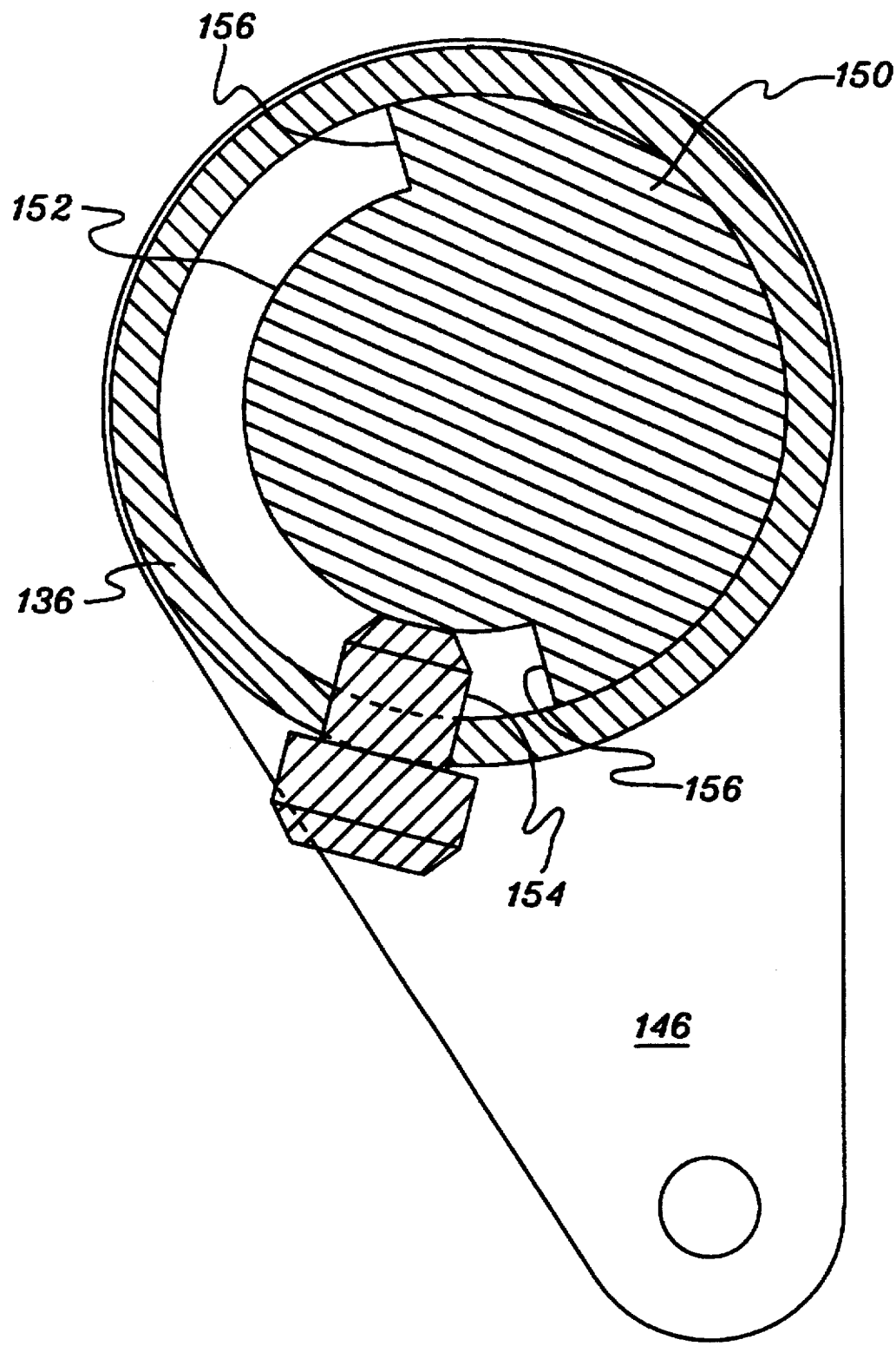
FIG. 12 is a cross-sectional view taken along 12—12 of FIG. 10.

Referring now to FIGS. 11 and 12, handle lever 146 depends orthogonally from a cylindrical rod 150 which is rotatably disposed concentrically within base 136 (FIG. 12). A generally annular trough 152 of a predetermined depth extends a predetermined distance about the circumference of rod 150. A lug 154 (FIG. 12) is rigidly disposed in the wall of base 136 and extends into trough 152. The lug and trough engagement serves to retain rod 150 within base 136, while permitting the base to rotate a predetermined angular distance relative to the rod before lug 154 engages either end 156 of trough 152 and thereby rotates rod 150. In this manner, the lug picks up rod 150 which is then rotated therewith only during a portion of the rotational movement of the handles, whereby the handles are permitted to rotate a full 180 degrees, while levers 146 and 148 pivot within the substantially smaller preferred arc of 10–35 degrees.

Figure 13:
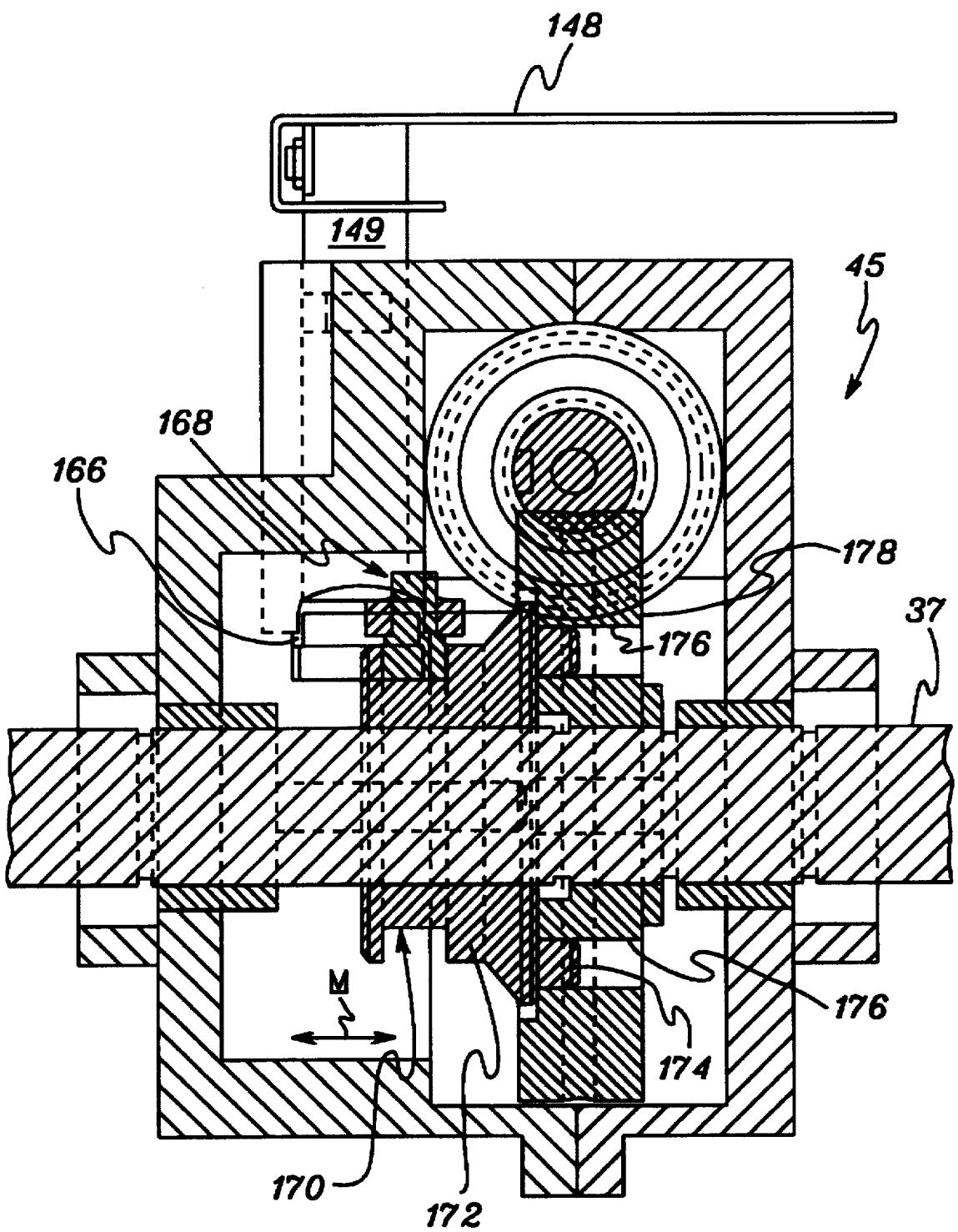
FIG. 13 is a cross-sectional front view of the transmission of the tiller of FIGS. 8 and 10 in the wheel engage mode.

Referring now to FIG. 13, transmission lever 148 is shown disposed on transmission shaft 149 which itself is rotatably supported by transmission 45. A wheel engagement lever 166 extends orthogonally from a lower end of shaft 149 and engages an abutment 168. This abutment is received by an annular channel 170 disposed circumferentially within a generally cylindrical clutch disk 172. Clutch disk 172 is concentrically disposed about wheel axle 37 such that it rotates with axle 37 while being slidable in the axial direction as indicated by arrow m in response to pivotal movement of transmission lever 148.

Clutch disk 172 comprises a plurality of circumferentially spaced engagement fingers 174 which extend axially therefrom to selectively engage and disengage holes 176 disposed in drive gear 178 in response to the axial movement of the clutch disk. The drive gear is concentrically disposed about axle 37 in a manner which permits drive gear 178 to rotate independently of the wheel axle, while it is prevented from moving axially relative thereto. Drive gear 178 is driven continuously by the engine when the engine is activated so that when the clutch disk has been moved axially a sufficient distance to allow fingers 174 to be received by holes 176, as shown in FIG. 13, the clutch disk (and consequently, axle 37) is driven thereby. In a preferred embodiment, biasing means, such as a spring, (not shown) serves to bias the clutch disk axially towards the drive gear to facilitate engagement therewith.

Figure 14:
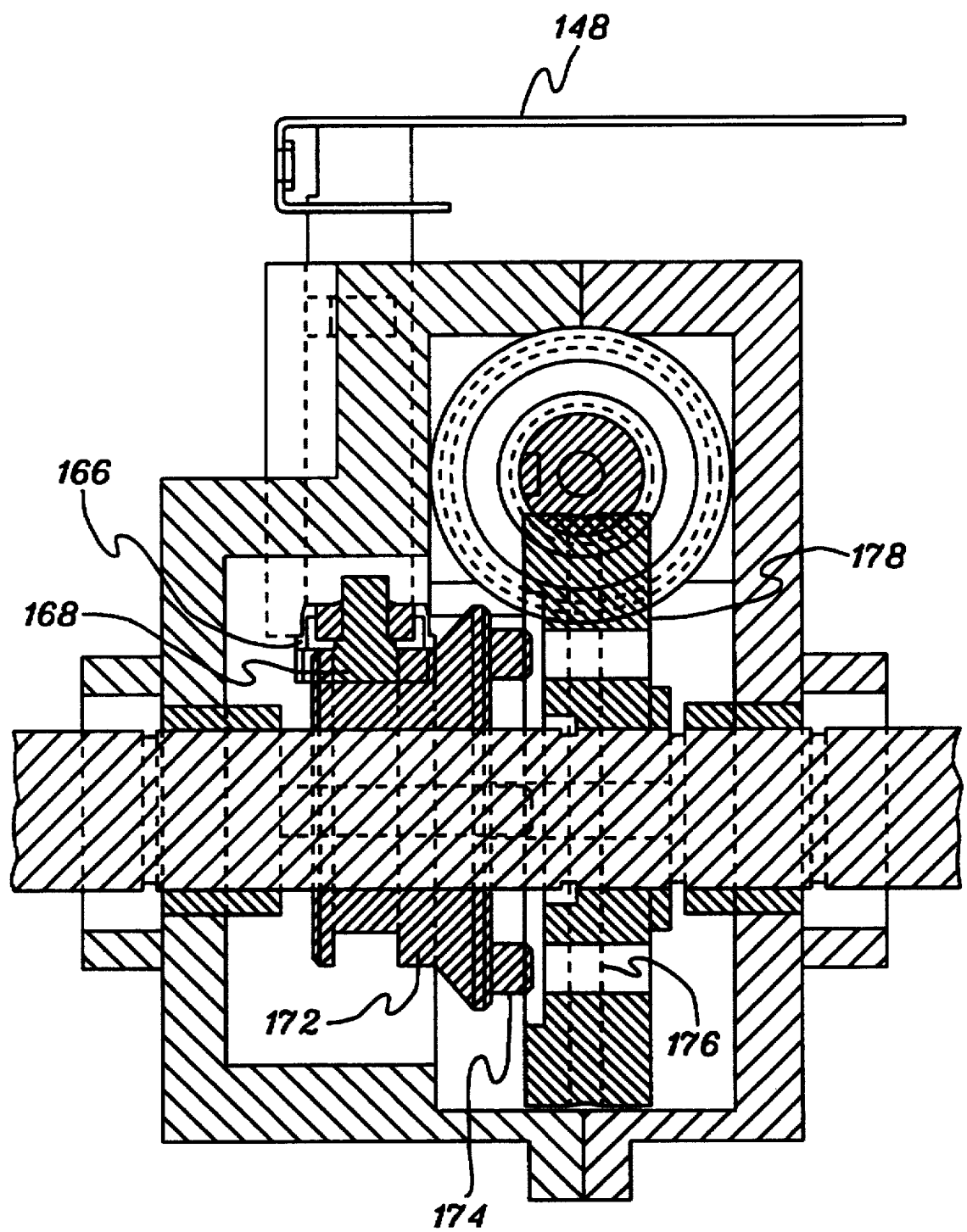
FIG. 14 is a view similar to that of FIG. 13, of the transmission in the wheel disengage mode.

As shown in FIG. 14, clutch disk 172 has moved axially away from drive gear 178 in response to pivotal movement of lever 148, to disengage wheels 36.

Figure 15:
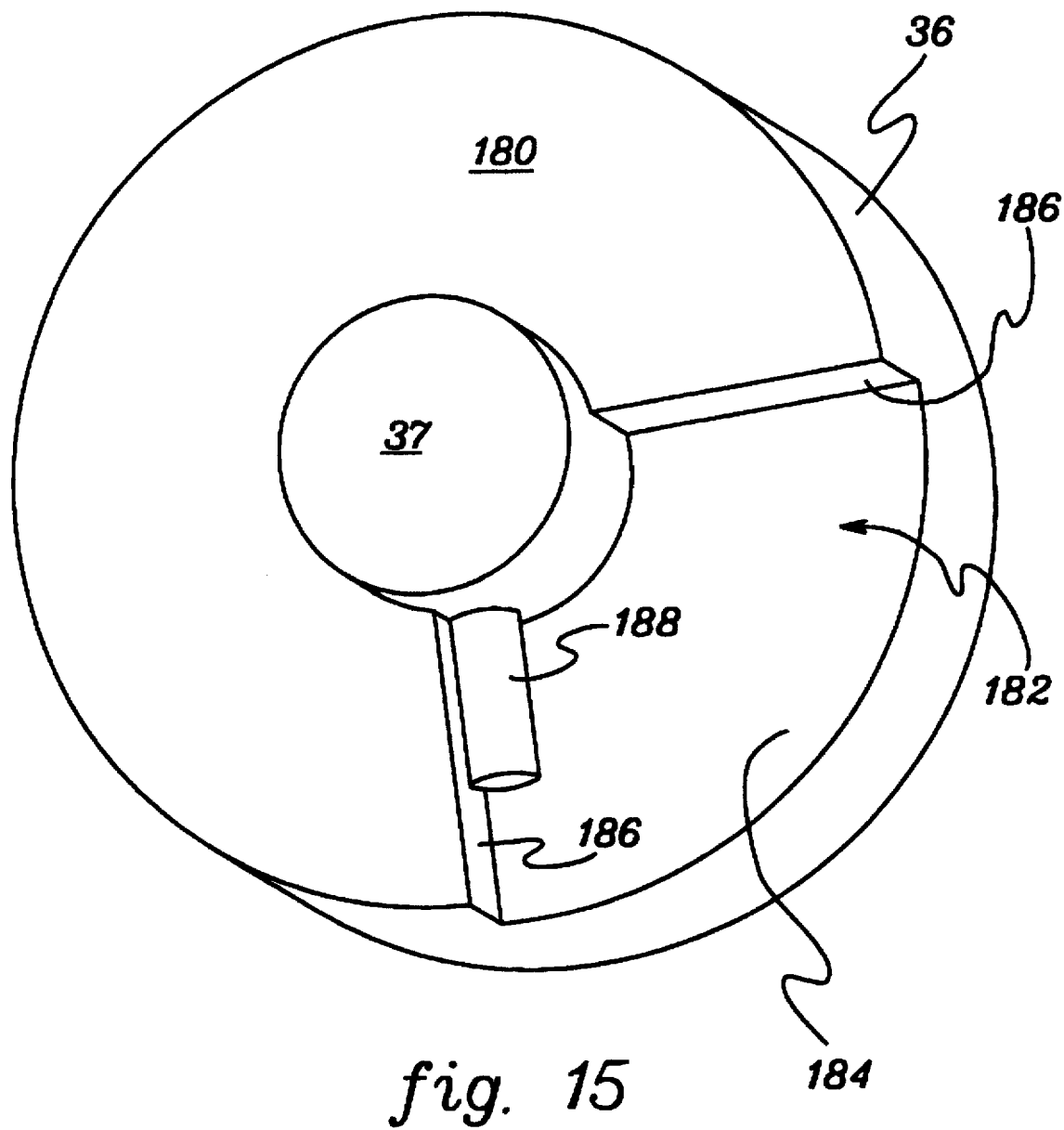
FIG. 15 is a schematic perspective view of a portion of the tiller of FIGS. 1-4.

Referring now to FIG. 15, wheels 36 each have a substantially planar inner surface 180 disposed generally transversely to axle 37 and which faces chassis 44 (FIGS. 1–4) when properly assembled the axle. The surface has a cavity 182 therein defined by a planar floor 184 which is substantially parallel to surface 180, and walls 186 disposed transversely thereto. Walls 186 each extend in a radial direction from the center of rotation of the wheel and are spaced at a predetermined angle, preferably approximately 90 degrees, from one another. The cavity serves to receive a drive rod 188 which depends orthogonally from axle 37. Wheel 36 is rotatably disposed about axle 37 wherein the axle may rotate independently of the wheel for the predetermined angle until drive rod 188 engages one of the walls 186. This construction therefore, in a simple and cost effective manner, drives both wheels, while it also allows the wheels to rotate independently of one another to a limited degree. The benefit accorded by such independent rotation is that the outside wheel is permitted to rotate faster than the inside wheel when turning the tiller around a corner. This feature therefore substantially reduces the scuffing or skidding which would otherwise occur during turning if both wheels were rigidly fastened to the axle.

Figure 16:
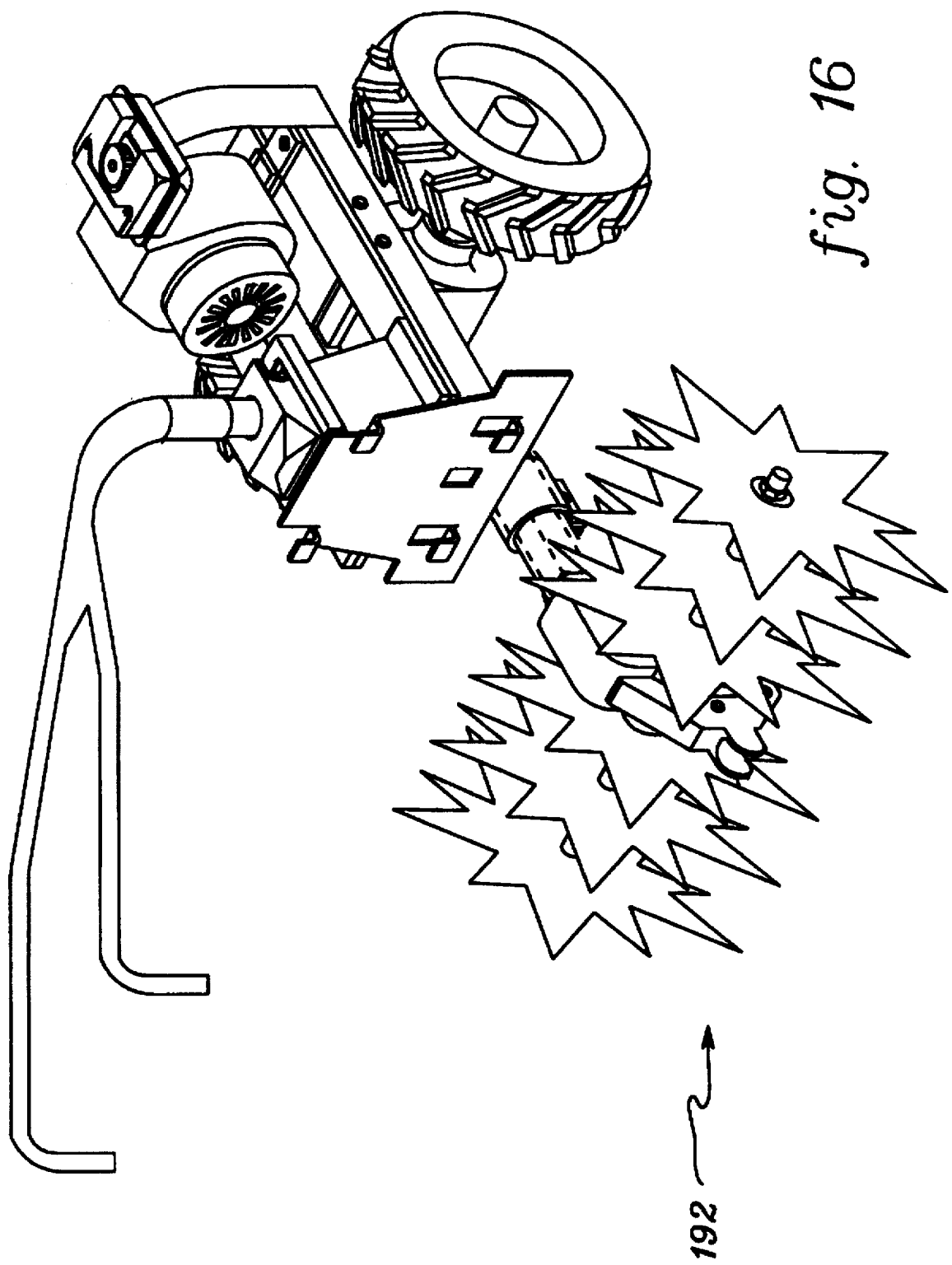
FIG. 16 is a view similar to that of FIG. 3, with the tines replaced with an aerator attachment.
Figure 17:
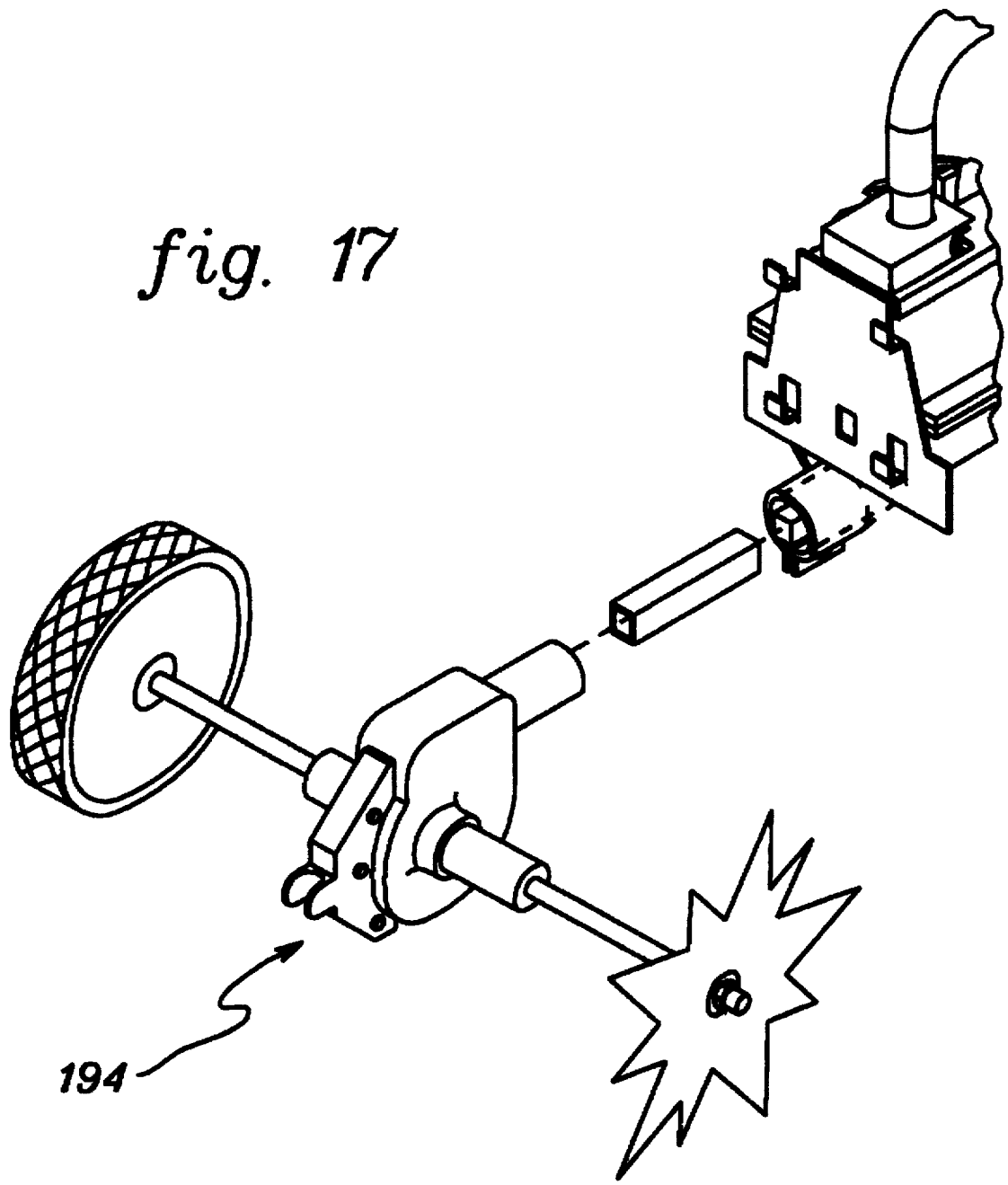
FIG. 17 is a view similar to that of FIG. 16, with the tines replaced with an edger attachment.
Figure 18:
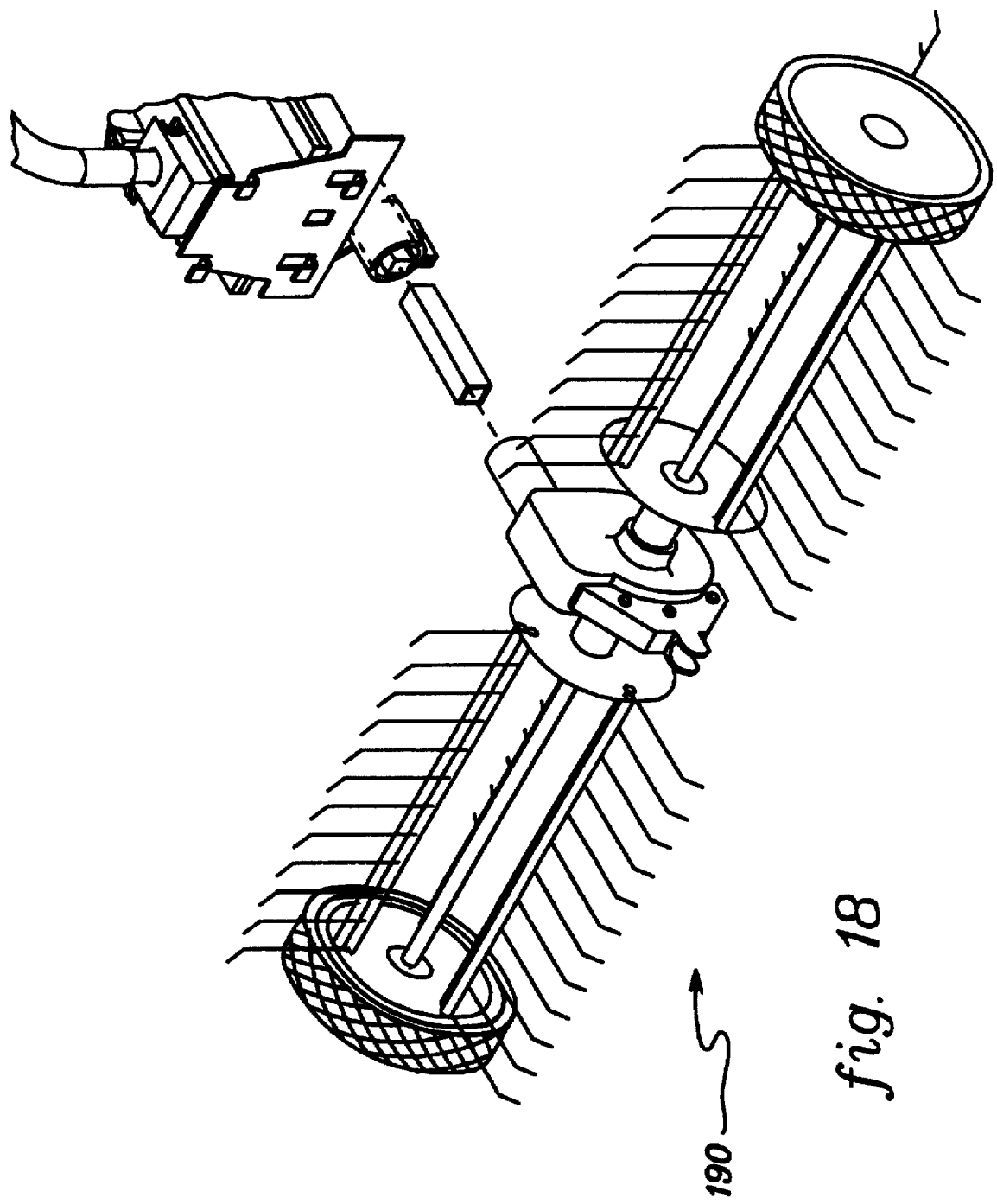
FIG. 18 is a view similar to that of FIG. 17, with the tines replaced with a dethatcher or power rake attachment.

Referring now to FIGS. 16–18, the tines may be replaced with alternate implements or attachments. These attachments are all preferably utilized in the rear tine CRT mode. The hood is also typically engaged, although it is not shown in the drawings. In addition, wings (not shown) may be installed on either side of the hood to extend the hood a sufficient distance to fully cover implements such as a power rake or dethatcher 190 (FIG. 18) which may typically extend across a greater width than the standard tines. The wings may conveniently be fastened to the hood in any conventional manner such as by threaded fasteners which pass through overlapping portions thereof. In addition to the power rake of FIG. 18, FIG. 16 shows the tines replaced with a conventional aerator 192 and FIG. 17 shows a conventional edger 194 disposed in place of the tines. Each of these attachments may be disposed on gearbox 40 by removing the tine shaft therefrom in a conventional manner. Alternatively, each alternate implement may be disposed on its own gearbox 40 which can be selectively interchanged as discussed hereinafter.

Additional attachments, such as conventional snow thrower and sickle bar attachments (not shown) may also be used in place of the tines when the tiller is in the front tine mode.

It should be understood by one skilled in the art that although the invention was described as incorporating an internal combustion engine, any type of engine capable of rotatably driving an output shaft, including an electric motor, could be utilized without departing from the spirit and scope of the present invention.

A preferred embodiment of the invention having been fully described, the following is a description of the operation thereof.

Operation of the rear tine SRT tiller of FIG. 1 comprises adjusting the height of depth regulator 54 by squeezing legs 96 (FIG. 6A) together and sliding spring clip 94 along sleeve 92 as discussed hereinabove. Once properly adjusted, the tiller is then operated in a conventional manner.

The tiller is converted to CRT operation by first removing the hood from the tiller. This is accomplished by disengaging latch 116 (FIG. 7) from the chassis. The user then raises the spring clip to its uppermost position relative to the sleeve to clear the prongs as shown in phantom in FIG. 6A. Once clear, the spring clip may then be rotated about axis n approximately 90 degrees to orient one of the diametrically opposed keys of sleeve 92 towards the open portion of U-shaped bracket 56. When so disposed, the sleeve may be removed from the bracket simply by sliding it out the open portion. This action will move the hood away from the chassis to simultaneously disengage the hood from hooks 52 (FIG. 7) and release the hood from the tiller.

The next step is to loosen the fastener that holds flanges 86 (FIG. 4) of receptacle 84. Receptacle 84 will thereby release gearbox 40 and permit the gearbox to be rotated 180 degrees about axis d. Once the gearbox is so rotated, the fastener is then tightened to secure the gearbox in this inverted position. In this orientation, the tiller will operate in the CRT mode as discussed hereinabove. Movement of the tines into the CRT mode will also serve to disengage the stop or kill switch as discussed hereinabove, which would otherwise prevent the handles from being pivoted into the front tine mode.

The hood is then replaced on the tiller by reversing the aforementioned hood removal steps, with the exception that openings 112 of the hood are engaged with lower hooks 60 (FIG. 7), rather than upper hooks 52 of the chassis. Additionally, once installed, as set forth hereinabove, spring clip 94 is rotated an additional 180 degrees, wherein legs 96 extend towards, rather than away from, the chassis. This serves to point lower end 58 of the depth regulator towards the chassis. The depth regulator is typically not used in the rear tine CRT mode because CRT tilling is generally used to till to a maximum depth in hard soil or previously untilled soil. The depth regulator is therefore maintained in its uppermost position by release of the spring clip in its uppermost position relative to sleeve 92. In this manner, lower end 58 of the depth regulator is disposed in generally superposed relation to a lower portion of gearbox 40, as shown in FIG. 2 to "nest" the lower end with the gearbox. When so disposed, keys 104 are engaged with trough 105 of bracket 56 to secure the hood to the chassis and gearbox, while the depth regulator is stored in a manner which prevents it from interfering with operation of the tines.

When in this rear tine CRT mode, the tiller is operable in a generally conventional manner. As mentioned hereinabove, in the event the wheels do lose traction and begin to spin, the user need simply apply a light upward pressure to the handles to permit the wheels to regain traction. This lifting action is facilitated by the aforementioned light overall weight of the tiller.

Also in the rear tine CRT mode, the tines may be replaced with alternate implements, such as the aforementioned edger, aerator and dethatcher or power rake. Such replacement may be made simply by removing the threaded fasteners which secure the tines to the tine shaft and replacing with the alternate implements. Alternatively, the alternate implements may be disposed on separate gearboxes, wherein they may be installed simply by loosening the receptacle 84 (FIG. 4), removing the existing gearbox and replacing it with the gearbox on which the desired implement is disposed. This simple gearbox replacement is enabled by the sectional construction of transmission output shaft 47 as discussed hereinabove which permits the second end portion 66 to be separated from intermediate portion 70 of the output shaft simultaneously with withdrawal of the output shaft housing from receptacle 84.

In both the rear tine SRT and CRT modes, once the user begins tilling operations, the wheel axle will begin to rotate until drive rod 188 (FIG. 15) thereof engages one of the walls of cavity 182 of the wheels to drive the wheels forward. When the user turns the tiller, the wheel disposed on the inside of the turn will generally remain engaged with the drive rod. During the turn however, the wheel disposed on the outside of the turn is permitted to rotate up to 90 degrees (in the preferred embodiment) ahead of the wheel axle. Since both wheels optimally are provided with a cavity 182 and drive rod 188, during this turn, the inside wheel may also be rotated up to 90 degrees in the backwards direction relative to the rotation of the wheel axle. The combination of these two actions thus permit one wheel to rotate a full 180 degrees ahead of the other wheel without scuffing, as mentioned hereinabove, to greatly improve maneuverability of the tiller.

The tiller may be converted to the front tine tilling or cultivating mode as follows. The first step involves removing the hood in the manner discussed above. As discussed hereinabove, the hood interlock will prevent the tiller from operating in the front tine mode unless the hood has been removed. The next step involves loosening handle 122 (FIG. 8) of the cam lock device to release handles 32 (FIG. 1), pivoting the handles 180 degrees and adjusting the handle height in the manner discussed hereinabove, followed by tightening the handle to secure the handles in place.

The pivoting action of the handles will serve to pivot handle lever 146 (FIG. 10) which, in turn, pivots transmission lever 148 (FIG. 13), transmission shaft 149 and wheel engagement lever 166. Lever 166 consequently pivots abutment 168 which serves to disengage clutch disk 172 from drive gear 178. In this manner, the wheels are automatically disengaged from the engine whenever the tiller is converted into the front tine mode.

The tiller may be converted back to either of the previously described modes by simply reversing the aforementioned steps.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

| PARTS LIST | |
|---|---|
| 30 | tiller |
| 32 | handles |
| 34 | tines |
| 36 | wheels |
| 37 | wheel axle |
| 38 | convex leading edge |
| 40 | power take off gearbox |
| 42 | output shaft housing |
| 44 | chassis |
| 46 | engine |
| 47 | transmission output shaft |
| 48 | tine shaft |
| 50 | hood |
| 52 | upper slots or hooks |
| 54 | depth regulator |
| 56 | nose or bracket |
| 58 | lower end |
| 60 | lower slots or hooks |
| 61 | hinged extension |
| 62 | cam lock device |
| 64 | first end portion |
| 66 | second end portion |
| 68 | engagement knob |
| 69 | engagement knob |
| 70 | third intermediate portion |
| 72 | pulley housing |
| 74 | inboard side |
| 76 | outboard side |
| 80 | worm gear |
| 82 | worm wheel |
| 84 | receptacle |
| 86 | flanges |
| 90 | cylindrical shaft |
| 91 | pin |
| 92 | sleeve |
| 94 | spring clip |
| 96 | legs |
| 97 | aperture or opening |
| 98 | bight (of spring clip) |
| 100 | slots |
| 102 | grip portion |
| 104 | keys |
| 105 | trough |
| 106 | fork |
| 108 | prongs |
| 110 | radiused surface |
| 112 | openings |
| 114 | flange |
| 116 | latch |
| 117 | hooked blade |
| 118 | hook plate |
| 120 | upper catch |
| 122 | handle |
| 124 | cam surface |
| 126 | stanchions |
| 128 | pin |
| 130 | elongated slots |
| 131 | bore |
| 132 | collar |
| 134 | bore |
| 136 | base |
| 138 | gap |
| 140 | arms |
| 142 | nut |
| 144 | bore |
| 145 | bores (stanchions) |
| 146 | handle lever |
| 148 | transmission lever |
| 149 | transmission shaft |
| 150 | rod |
| 151 | transmission |
| 152 | trough |
| 154 | lug |
| 156 | end of trough |
| 158 | corner |
| 160 | planar surface |
| 162 | narrow profile bearing |
| 164 | standard bearings |

-continued

| PARTS LIST | |
|---|---|
| 166 | wheel engagement lever |
| 168 | abutment |
| 170 | channel |
| 172 | clutch disk |
| 174 | engagement fingers |
| 176 | holes |
| 178 | drive gear |
| 180 | inner surface of wheels |
| 182 | cavity |
| 184 | floor |
| 186 | walls |
| 188 | drive rod |
| 190 | power rake |
| 192 | aerator |
| 194 | edger |

Having thus described my invention, what is claimed is:

1. A convertible garden tiller comprising:
a chassis, at least a pair of ground engaging wheels supporting said chassis, an engine mounted on said chassis capable of driving said at least a pair of ground engaging wheels in a given direction, a plurality of tines for working the earth disposed on said chassis to rotate in response to operation of said engine, each of said plurality of tines having a shape favoring a particular direction of movement through the earth, said plurality of tines being selectively positionable to rotate in said given direction and in a second direction opposite to said given direction such that each said tine moves through the earth only in said particular direction of movement.

2. The convertible garden tiller of claim 1, wherein said plurality of tines are disposed on an elongated tine shaft, said elongated tine shaft having a longitudinal axis and being rotatably disposed on said chassis to rotate about said longitudinal axis in response to operation of said engine, said elongated tine shaft being pivotable 180 degrees about an axis transverse to said longitudinal axis, to selectively rotate said plurality of tines in said given direction and second direction.

3. The convertible garden tiller of claim 2, wherein said elongated tine shaft is rotatably disposed on a power take off gearbox, wherein said power take off gearbox is operatively engaged by an output shaft rotatably driven by said engine, and wherein said power take off gearbox is selectively pivotable about said output shaft to effect said selective positioning of said plurality of tines.

4. The convertible garden tiller of claim 3, wherein said power take off gearbox comprises a worm gear disposed on said output shaft and a worm wheel which is operatively engaged with said worm gear.

5. The convertible garden tiller of claim 3, wherein said output shaft is disposed within a shaft housing, said shaft housing being rigidly disposed on said power take off gearbox.

6. The convertible garden tiller of claim 5, wherein said shaft housing is receivable by a receptacle disposed on said chassis to thereby support said power take off gearbox.

7. The convertible garden tiller of claim 6, wherein said shaft housing is selectively pivotable relative to said receptacle to effect said selective positioning of said plurality of tines.

8. The convertible garden tiller of claim 7, wherein said shaft housing is selectively pivotable within said receptacle without removing said shaft housing from said receptacle.

9. The convertible garden tiller of claim 8, wherein said shaft housing and said receptacle are generally cylindrical and said receptacle further comprises a collar lock for releasably locking said shaft housing to said receptacle.

10. The convertible garden tiller of claim 7, wherein said output shaft comprises a first discrete end portion disposed on said chassis, a second discrete end portion disposed on said power take off gearbox, and a third intermediate portion operatively engaging said first discrete end portion and said second discrete end portion for preventing relative rotational movement between said first discrete end portion and said second discrete end portion while permitting relative longitudinal movement therebetween.

11. The convertible garden tiller of claim 10, wherein said first discrete end portion and said second discrete end portion are selectively disengagable from one another by longitudinal movement away from one another.

12. The convertible garden tiller of claim 11, wherein said first discrete end portion and said second discrete end portion each comprise an engagement knob of symmetrical cross-section, said engagement knobs being receivable by opposite ends of said intermediate portion, each of said opposite ends having an asymmetrical cross-section.

13. The convertible garden tiller of claim 12, wherein each said engagement knob has a substantially square cross-section, and wherein said intermediate portion comprises a tube of substantially square cross-section.

14. The convertible garden tiller of claim 1, further comprising a pair of guide handles which are selectively pivotable from a position above said plurality of tines to a position above said ground engaging wheels for alternately converting said convertible garden tiller from a rear tine mode to a front tine mode.

15. The convertible garden tiller of claim further comprising a safety device which prevents said pair of guide handles from being pivoted to said position above said ground engaging wheels when said plurality of tines are positioned to rotate in said given direction.

16. The convertible garden tiller of claim 14, further comprising a hood which is selectively disposed in spaced relation to said plurality of tines.

17. The convertible garden tiller of claim 16, further comprising a safety device which prevents operation of said tiller in said front tine mode if said hood is disposed in said spaced relation to said plurality of tines.

18. The convertible garden tiller of claim 14, wherein said ground engaging wheels are automatically disengaged from said engine when said convertible garden tiller is converted to said front tine mode.

19. The convertible garden tiller of claim 14, wherein said pair of guide handles are pivotable about a vertical axis.

20. The convertible garden tiller of claim 14, wherein said pair of guide handles are selectively vertically adjustable.

21. The convertible garden tiller of claim 20, further comprising a releasable locking device for enabling said selective vertical adjustment and for locking said pair of handles into position, said releasable locking device being manually operable by a user using only a single hand.

22. The convertible garden tiller of claim 14, further comprising a releasable locking device for enabling said pair of guide handles to be selectively locked in said position above said plurality of tines and said position above said ground engaging wheels by a user using only a single hand.

23. The convertible garden tiller of claim 22, wherein said releasable locking device further enables said pair of handles to be vertically adjusted.

24. The convertible garden tiller of claim 23, wherein said releasable locking device comprises a cam lock device.

25. A convertible garden tiller comprising:

a chassis, at least a pair of ground engaging wheels supporting said chassis, an engine mounted on said chassis, a plurality of tines for working the earth disposed on said chassis to rotate in response to operation of said engine, a depth regulator disposed on said chassis for maintaining said plurality of tines at a predetermined depth in the earth during tilling operations, wherein said depth regulator comprises an elongated shaft, a sleeve for covering the elongated shaft and a manually operable control device coupled to the elongated shaft and releasably biased against the sleeve, wherein said manually operable control device is selectively operable to enable continuous movement thereof relative to said sleeve along a length of said sleeve for unfixed positioning of said elongated shaft.

26. The convertible garden tiller of claim 25, wherein said depth regulator is adjustable by a user using only a single hand.

27. The convertible garden tiller of claim 26, wherein said manually operable control device comprises a spring clip selectively compressible against its bias to enable movement of said spring clip relative to said sleeve.

28. The convertible garden tiller of claim 27, wherein said elongated member is generally cylindrical.

29. The convertible garden tiller of claim 28, further comprising a hood disposed in spaced relation to said plurality of tines, wherein said elongated member comprises a portion of said depth regulator, and wherein said spring clip is disposed proximate said hood.

30. The convertible garden tiller of claim 29, wherein said elongated member comprises a generally cylindrical tube disposed on said hood and said depth regulator comprises a generally cylindrical rod slidably disposed in substantially concentric orientation within said generally cylindrical tube.

31. The convertible garden tiller of claim 30, wherein said spring clip is disposed at an upper end of said generally cylindrical rod.

32. The convertible garden tiller of claim 30, wherein an upper portion of said generally cylindrical rod is substantially straight and has a longitudinal axis, said generally cylindrical rod being selectively rotatable approximately 180 degrees about said longitudinal axis to accommodate selective rotation of said plurality of tines in both a given direction and a second direction opposite said given direction.

33. The convertible garden tiller of claim 32, wherein said depth regulator is rotatable by rotation of said spring clip about said longitudinal axis.

34. The convertible garden tiller of claim 33, wherein said generally cylindrical rod has an earth engaging curved lower portion which terminates in a lower end disposed in a substantially horizontal position during operation of said convertible garden tiller, said lower end being selectively pointable in response to rotation of said spring clip.

35. The convertible garden tiller of claim 27, wherein said spring clip further comprises a bight portion and at least a pair of generally parallel legs depending therefrom, said pair of generally parallel legs being biased away from one another, each of said pair of generally parallel legs having an opening disposed therein, each said opening being sized and shaped to permit said elongated member to pass therethrough when said legs are compressed against their bias towards a generally parallel orientation, and to bind said elongated member against an edge of each said opening when said legs are released to maintain said spring clip in a substantially stationary position relative to said elongated member.

36. The convertible garden tiller of claim 35, wherein said elongated member comprises a substantially circular shaft, wherein each said opening is substantially circular, having a diameter between approximately 110 percent and 140 percent of the diameter of said substantially circular shaft.

37. A convertible garden tiller comprising:
a chassis, at least a pair of ground engaging wheels supporting said chassis, an engine mounted on said chassis, a plurality of tines for working the earth disposed on said chassis to rotate in response to operation of said engine, a depth regulator for maintaining said plurality of tines at a predetermined depth in the earth during tilling operations, a hood disposed over said plurality of tines, said hood being disposed integrally with said depth regulator, and a manually operable control device for both releasably fastening a portion of said hood to said convertible garden tiller and adjusting said depth regulator.

38. The convertible garden tiller of claim 37, wherein each of said plurality of tines has a shape favoring a particular direction of movement through the earth, and wherein said hood and said depth regulator accommodate selective positioning of said plurality of tines to rotate in a given direction and in a second direction opposite to said given direction such that each said tine moves through the earth only in said particular direction of movement.

39. The convertible garden tiller of claim 38, wherein said manually operable control device is operable by only a single hand.

40. The convertible garden tiller of claim 38, wherein said manually operable control device further comprises a spring clip releasably biased against an elongated member, wherein said spring clip is selectively compressible against its bias to enable movement of said spring clip relative to said elongated member along a length of said elongated member for adjusting said depth regulator.

41. The convertible garden tiller of claim 40, wherein said elongated member is generally cylindrical.

42. The convertible garden tiller of claim 40, wherein said elongated member comprises a generally cylindrical tube disposed on said hood and said depth regulator comprises a generally cylindrical rod slidably disposed in substantially concentric orientation within said generally cylindrical tube.

43. The convertible garden tiller of claim 42, wherein said spring clip is disposed at an upper end of said generally cylindrical rod.

44. The convertible garden tiller of claim 43, wherein an upper portion of said generally cylindrical rod is substantially straight and has a longitudinal axis, said generally cylindrical rod being selectively rotatable approximately 180 degrees about said longitudinal axis to accommodate rotation of said plurality of tines in both said given direction and said second direction.

45. The convertible garden tiller of claim 44 wherein said depth regulator is rotatable by rotation of said spring clip about said longitudinal axis.

46. The convertible garden tiller of claim 45, wherein said generally cylindrical rod has an earth engaging curved lower portion which terminates in a lower end disposed in a substantially horizontal position during operation of said convertible garden tiller, said lower end being selectively pointable in response to rotation of said spring clip.

47. The convertible garden tiller of claim 45, wherein said spring clip further comprises a bight portion and at least a pair of generally parallel legs depending therefrom, said pair of generally parallel legs being biased away from one another, each of said pair of generally parallel legs having an opening disposed therein, each said opening being sized and shaped to permit said generally cylindrical tube to pass therethrough when said pair of generally parallel legs are compressed against their bias towards an orientation generally parallel to one another and to bind said generally cylindrical tube against an edge of each said opening when said legs are released to maintain said spring clip in a substantially stationary position relative to said generally cylindrical tube.

48. The convertible garden tiller of claim 47, wherein said generally cylindrical tube is rotatable with said generally cylindrical rod and said spring clip about said longitudinal axis for selectively fastening and releasing said hood and said depth regulator from said chassis.

49. The convertible garden tiller of claim 48, wherein said generally cylindrical tube further comprises at least one key disposed thereon for selectively engaging an annular cavity disposed on said chassis for fastening and releasing said hood and said depth regulator from said chassis.

50. The convertible garden tiller of claim 49, further comprising a power take off gearbox which is selectively rotatable about a horizontal axis to reverse said direction of rotation of said plurality of tines, said annular cavity being disposed on said power take off gearbox at a position generally co-planar with a horizontal plane passing through a center of rotation of said plurality of tines, whereby said hood and said depth regulator are fastenable thereto when said power take off gearbox is disposed to rotate said plurality of tines in either said direction.

51. The convertible garden tiller of claim 49, wherein said generally cylindrical tube is selectively rotatable between approximately 0 and 90 degrees to engage and release said at least one key with said annular cavity, and is selectively rotatable between approximately 90 and 270 degrees to selectively point said lower end.

52. The convertible garden tiller of claim 51, further comprising a locking clip to releasably prevent rotation of said spring clip.

53. A convertible garden tiller comprising:
a chassis, at least a pair of ground engaging wheels supporting said chassis, a pair of guide handles disposed on said chassis by which an operator may guide said convertible garden tiller, an engine mounted on said chassis for selectively driving said at least a pair of ground engaging wheels in a given direction, a plurality of tines for working the earth disposed on said chassis to rotate in response to operation of said engine, wherein said pair of guide handles are selectively pivotable between a front tine mode positioned above said at least a pair of ground engaging wheels and a rear tine mode positioned above said plurality of tines for selectively converting between said front tine mode and said rear tine mode, and wherein said at least a pair of ground engaging wheels are automatically disengaged from said engine in response to said selective pivotable movement of said pair of guide handles from said rear tine mode to said front tine mode.

54. The convertible garden tiller of claim 53, wherein said at least a pair of ground engaging wheels are automatically disengaged from said engine when said convertible garden tiller is converted to said front tine mode.

55. A convertible garden tiller comprising:
a chassis, at least a pair of ground engaging wheels supporting said chassis, a pair of guide handles disposed on said chassis for guiding said convertible garden tiller, an engine mounted on said chassis for driving said at least a pair of ground engaging wheels in a given direction, a plurality of tines for working the earth disposed on said chassis to rotate in response to operation of said engine, each of said plurality of tines having a shape favoring a particular direction of movement through the earth, said plurality of tines being selectively positionable to rotate in said given direction and in a second direction opposite to said given direction such that each said tine moves through the earth only in said particular direction of movement, a depth regulator for maintaining said plurality of tines at a predetermined depth in the earth during tilling operations, wherein said depth regulator comprises an elongated shaft, a sleeve for covering the elongated shaft, and a manually operable control device coupled to the elongated shaft and releasably biased against the sleeve, wherein said manually operable control device is selectively operable to enable continuous movement thereof relative to said sleeve along a length of said sleeve for unfixed positioning of said elongated shaft, a hood disposed over said plurality of tines, wherein said depth regulator is disposed integrally with said hood for operation when said plurality of tines are rotating in either said direction and comprises a manually operable control device for both releasably fastening a portion of said hood to said convertible garden tiller and adjusting said depth regulator, and wherein said pair of guide handles are selectively pivotable about a vertical axis from a position above said at least a pair of ground engaging wheels to a position above said plurality of tines for selectively converting between a front tine tiller and a rear tine tiller.

56. A convertible lawn and garden maintenance machine comprising:

a chassis, at least a pair of ground engaging wheels supporting said chassis, an engine mounted on said chassis capable of driving said at least a pair of ground engaging wheels in a given direction, a plurality of earth working implements disposed on said chassis to rotate in response to operation of said engine, said plurality of earth working implements being selectively rotatable in said given direction and in a second direction opposite to said given direction, wherein said plurality of earth working implements are disposed on at least one elongated shaft having a longitudinal axis and being disposed on said chassis to rotate about said longitudinal axis in response to operation of said engine, said at least one elongated shaft being pivotable 180 degrees about an axis transverse to said longitudinal axis to selectively rotate said plurality of earth working implements in said given direction and said second direction.

57. The convertible lawn and garden maintenance machine of claim 56, wherein said pluarlity of earth working implements comprise a tine.

58. The convertible lawn and garden maintenance machine of claim 56, wherein said plurality of earth working implements comprise an edger.

59. The convertible lawn and garden maintenance machine of claim 56, wherein said plurality of earth working implements comprise an aerator.

60. The convertible lawn and garden maintenance machine of claim 56, wherein said plurality of earth working implements comprise a power rake.

\* \* \* \* \*

UNITED STATES PATENT AND TRADEMARK OFFICE
CERTIFICATE OF CORRECTION

PATENT NO. : 5,713,420
DATED : Feb. 3, 1998
INVENTOR(S) : Roberts et al.

It is certified that error appears in the above-identified patent and that said Letters Patent is hereby corrected as shown below:

Column 15, line 32,     "The convertible garden tiller of claim" should read
--The convertible garden tiller of claim 14,--.

Signed and Sealed this

Twenty-third Day of June, 1998

Attest:

BRUCE LEHMAN

*Attesting Officer*     *Commissioner of Patents and Trademarks*